(12) United States Patent
Watterott et al.

(10) Patent No.: US 8,417,741 B2
(45) Date of Patent: Apr. 9, 2013

(54) SYSTEM AND METHOD FOR REPLICATION, INTEGRATION, CONSOLIDATION AND MOBILISATION OF DATA

(75) Inventors: Roland Watterott, Wolfratshausen (DE); Justus Lorentz, Wolfratshausen (DE)

(73) Assignee: moxite GmbH, Munich (DE)

( * ) Notice: Subject to any disclaimer, the term of this patent is extended or adjusted under 35 U.S.C. 154(b) by 0 days.

(21) Appl. No.: 11/597,925

(22) PCT Filed: May 27, 2005

(86) PCT No.: PCT/EP2005/005720
§ 371 (c)(1),
(2), (4) Date: Jul. 15, 2008

(87) PCT Pub. No.: WO2005/120011
PCT Pub. Date: Dec. 15, 2005

(65) Prior Publication Data
US 2008/0270490 A1 Oct. 30, 2008

(30) Foreign Application Priority Data
May 28, 2004 (EP) .................................. 04012750

(51) Int. Cl.
*G06F 17/30* (2006.01)
(52) U.S. Cl. ...................................................... 707/809
(58) Field of Classification Search .................. 707/200, 707/809
See application file for complete search history.

(56) References Cited

U.S. PATENT DOCUMENTS

| | | | |
|---|---|---|---|
| 2003/0187938 A1* | 10/2003 | Mousseau et al. | 709/206 |
| 2004/0083245 A1* | 4/2004 | Beeler, Jr. | 707/204 |
| 2004/0107201 A1* | 6/2004 | Morris | 707/101 |
| 2004/0158443 A1* | 8/2004 | Rajanarayanan | 703/2 |
| 2005/0005259 A1* | 1/2005 | Avery et al. | 717/103 |
| 2006/0085201 A1* | 4/2006 | Sultan | 705/1 |

OTHER PUBLICATIONS

6143_whitepaper_V2, Sybase Inc White Papers, 2003.*
Sybase, "Replication Server, Administration Guide," vol. 1, 454 pages, (2003).
Sybase, "Replication Strategies: Data Migration, Distribution and Synchronization, A Sybase White Paper," 30 pages (2003).
International Search Report for Application No. PCT/EP2005/005720, 2 pages, dated Aug. 17, 2005.

* cited by examiner

*Primary Examiner* — Amresh Singh
(74) *Attorney, Agent, or Firm* — Nelson Mullins Riley & Scarborough LLP

(57) ABSTRACT

The system for replication, integration, consolidation and mobilization of data according to the present invention provides a flexible framework of functionally autonomous and distributable modules with the main advantage of scalability, to simplify data integration, produce an integration structure that can accommodate backend structural changes and can cope with highly distributed data sources. Also, it creates a framework for delivering highly accessible, secure data to a mobile environment with minimal transfer loads during sending and receiving and secure data on the mobile client devices. Added to this, making use of modern mobile connection types for delivering push content from and/or to a wide spectrum of devices.

20 Claims, 24 Drawing Sheets

Overview

Overview

Distributed Data Sources

Multiple ReplicationServers

DataConnector 400

ReplicationServer 500

CommunicationServer 600

Public Communications Module 700

Private Communications Module 800

FIG 9
Private Data Storage Scheme
Data Store

| Unique Database Identifier |
| --- |
| Unique Table Identifier |
| Unique Field Identifier |
| Definition of the source Data Type |
| Flag to specify a Virtual field |
| Data segment |
| Time Stamp of a data change event |
| ID of the user, device and connection type from where the data change was initiated |

FIG 10
Private Data Storage Scheme
Database Definition

| Unique Database Identifier |
| --- |
| Backend data Source connection string |
| Backend data Location |
| Global Access Rights to the database |
| Backend Name of the data source |
| Server internal Name of the data source |
| Global Replication Rules of the database |
| Data connector ID identifying ownership |

FIG 11
Private Data Storage Scheme
Table Definition

| Unique Table Identifier |
| --- |
| Unique Database Identifier |
| Backend Table Name |
| Server internal Table Name |
| Global Replication Rules for the table |

FIG 12
Private Data Storage Scheme
User/Device Definition

| Unique User Identification |
|---|
| Global Access rights for read/write/delete access |
| Device Type |
| Connection Type |
| Access Times |

FIG 13
Private Data Storage Scheme
User Field Access Rules Definition

| Unique User Identification |
|---|
| Unique Field Identification |
| Global Access rights for read/write access |

FIG 14
Private Data Storage Scheme
Field Definition

| Unique Field Identification |
|---|
| Unique Database Identification |
| Unique Table Identification |
| Backend Field Name |
| Server internal Field Name |
| Field Data Type |
| Transformation Rules for data type conversion |
| Global Replication Rules |
| Flag to specify a Virtual field |
| Flag specifying access applicable to connection type |
| Read/write access rules for non secure connections |
| Read/write access rules for secure connections |
| Default field Value |
| Integrity Place Holder |
| Flag indicating if field is indexed |

Data flow

Client Device Modules 1800

Implementation Examples
Integration (Part 1a)

Implementation Examples
Integration (Part 1b)

Implementation Examples
Integration (Part 1c)

Implementation Examples
Integration (Part 2a)

Implementation Examples
Integration (Part 2b)

Implementation Examples
Integration (Part 2c)

Implementation Examples
Integration (Part 3a)

Implementation Examples
Integration (Part 3b)

Implementation Examples
Integration (Part 3c)

Implementation Examples
Mobility (Part 1a)

Implementation Examples
Mobility (Part 1b)

Implementation Examples
Mobility (Part 1c)

Implementation Examples
Mobility (Part 2)

Implementation Examples
Hosting options (Part 1)

Implementation Examples
Hosting options (Part 2a)

Implementation Examples
Hosting options (Part 2b)

Implementation Examples
Hosting options (Part 2c)

Combined Integration and Replication

SYSTEM AND METHOD FOR REPLICATION, INTEGRATION, CONSOLIDATION AND MOBILISATION OF DATA

RELATED APPLICATIONS

This application is a 35 U.S.C. 371 national stage filing of International Application No. PCT/EP2005/005720, filed 27 May 2005, which claims priority to Patent Application No. 04012750.8 filed on 28 May 2004 in Europe. The contents of the aforementioned applications are hereby incorporated by reference.

BACKGROUND OF THE INVENTION

The present invention relates to the integration and mobilization of data and interpersonal communication. Data may be retrieved from any type of structured data store, including legacy systems. The present invention makes use of specific data structures that may be implemented in data replication systems. In particular, the invention relates to such systems that need maximum flexibility in integrating and consolidating heterogeneous data sources and distribute such over communications links. The present invention is particularly suitable for data distribution over low-bandwidth communication links with optional push-functionality. Added to this, the system according to the present invention is both robust to handle large and distributed data sources in a business environment, and lean enough for optional personal use.

Most companies have their information pertaining to clients, products, staff, accounts, stock, drawings, etc. stored electronically. However, these data stores usually reside in different systems with limited integration between them.

Furthermore, interpersonal contact among employees and between employees and clients is largely conducted in electronic form. With today's trend towards greater mobility and shorter reaction times, it is vital that access to mission critical information is guaranteed at all times.

Firstly, the mobilization of data is currently only realized through lengthy and costly development cycles.

Secondly, the lack of integration in the backend systems prevents a consolidated view of mission critical information needed for fast reaction times.

Thus, the lack of consolidated information and integration with the vast amounts of interpersonal communication, makes mobile usage of information costly to implement and in the end laborious, if not impossible to use in an ad hoc fashion.

The implementation of a mobile data delivery system usually forces a company to also invest in expensive supporting infrastructure and applications like a web server and email server.

The diversity of legacy systems pervasive, even in individual companies, is a mayor hurdle when trying to develop solutions for the mobile delivery of data. Such systems usually require a high degree of integration and consolidation of data from such diverse sources and data structures. The classical method of developing interfaces between systems takes time, is expensive and error prone.

Furthermore, the result is usually too static to accommodate the rapidly changing needs of users, resulting in expensive redevelopment with every change on either end.

Classical interface protocols try to compensate their static nature by packaging the data in descriptive envelopes. This packaging, however, results in an expensive overhead in areas where the transmission of data needs to be optimized for speed and volume.

Classic push services, as are in high demand, are usually realized through (1) a timed pull from the client device, (2) a server initiated SMS (Short Message Service), or (3) WAP-Push (Wireless Access Protocol). Each of these implementation alternatives have drawbacks. Alternative (1) produces high traffic and is not actual real-time. Alternative (2) is limited by size due to the constraints of the Short Message Service and is limited to one bandwidth per sector. Alternative (3) requires a WAP-enabled device and produces disproportionately large transfer packages related to their content.

In view of the above mentioned problems, it is the aim of this invention to provide an easy means of integration between diverse data sources by simply installing and configuring the system as required in a very short time period.

It aims to facilitate the process of consolidating information from these data sources to make mission critical information accessible and manageable.

To maximize its effectiveness in integrating diverse systems, its aim is to provide maximum freedom in reach, i.e., source data may be at any location and in any structured data source.

To simplify and streamline tasks, an objective is to integrate interpersonal communication e.g. Email, Contacts, Appointments, Tasks, Fax, Voice etc. into the same delivery process as business data.

SUMMARY OF THE INVENTION

The system for mobilisation of data according to the present invention includes three modules, also referred to as components, with different functionality. These are a Data Connector, a Replication Server and a Communication Server. The modules may be combined in a way to provide at least one of the following: replication, integration, consolidation and mobilisation of data. The Replication Server may be connected via a communication link to a Data Connector, which itself may be connected to backend data, e.g., a data base or any other structured data source. Alternatively or in addition, the Replication Server may be connected via a communication link to a Communication Server, which itself may be connected via a communication link to a client application. Alternatively or in addition, the Replication Server may be connected via a communication link to another Replication Server, which itself may be connected to any number of anyone of the modules listed above.

One or more instances of any kind of modules may be implemented in combination or individually as needed. Each module communicates with another neighbouring module via a communication link, e.g., a TCP/IP connection, thus allowing distributed implementation. It is acknowledged that the communication links or connections might not be up and running all the time. However, in view of the present invention a communication link or connection exists between two modules, if such a link or connection is configured or set up in any kind, although it might not be available and usable at a particular point in time, such as a mobile telephone link, which is not always available.

In other words, anyone of the modules, namely, the Data Connector and the Communication Server, may be implemented in any number of instances and be combined around one or more Replication Servers, to offer maximum cooperative distribution.

Each module can perform its tasks autonomously, i.e., with or without access to the other modules. For this purpose, each module is provided with its own data store for keeping relevant data locally. The advantage is efficiency in a distributed environment or even beyond system boundaries to a $3^{rd}$ party.

E.g., mobile devices may connect to the Communication Server for updates even though the Data Connector is temporary not connected to the back end data source.

Each module may be configured via a central administration screen. Administration includes at least one of the following, the definition of data connections to backend sources, field level specification of data for replication purposes, integration rules between systems, user and device maintenance for access, etc.

The Data Connector is used to connect to data sources and define subsets of data that are intended for mobilisation or integration. The flow of data may be bidirectional. This process does not interrupt the normal operation of the backend systems. Backend data sources may be as diverse as, but not limited to, databases, desktop spreadsheets, email systems, streaming media, voice activated systems.

The Replication Server is responsible for the control and distribution of data throughout the system. Via an administration screen, forming a control interface, integration rules may be defined to structure and consolidate information, originating from different backend and mobile sources.

The Replication Server is also responsible for maintaining data access rights for users and groups. These rights are configurable down to field level and indicate, which access rights, e.g., read/write/delete, a user has per field. A further specialisation of data access rights includes the source of the change, e.g., a user may change product prices from his local desktop computer but not from his mobile device. The replication process also facilitates push functionality for specified data initiated by the server.

The Communication Server is responsible for the connectivity to mobile or desktop systems. It manages user access rights, e.g., who has access to the system when and with which devices, device types, connection speeds and storage capabilities.

The system described above runs independently of third party systems. Support systems offering functionality, like web servers, are not required and, thus, save the company unnecessary additional costs.

Communication with stationary or mobile client systems may be accomplished through common IP Socket communication, HTTP (Hypertext Transfer Protocol), WAP (Wireless Access Protocol), XML (Extensible Markup Language) or SyncML standards, anyone or all of which are advantageously hosted by the Connection Server without the need of third-party software.

An advantage of the present invention is to facilitate the delivery of information to mobile staff, irrespective of their preferred communications device. Due to the flexible modules a system according to the present invention may advantageously be realized all together within an implementation cycle of under 5 days.

An advantage is the simplification in the realization of the aforementioned objectives to the extent that with the help of the present invention, a company is able to accomplish these goals with its own information technology resources, without outside help, long development cycles or high costs.

An advantage of the present invention is a new approach to the handling of data to accommodate the above. Another advantage of the invention is a data structure which allows maximum freedom during the integration with other systems.

In view of the above, an advantage of the implemented data structures is that they can accommodate any type of data representation and type. An advantage is an optimized data structure for the use in replication systems that also may have to replicate over low-bandwidth communication links.

The data structure incorporates intelligent control mechanisms that will allow the system to maintain its own data integrity as well as integrity towards its source or target location.

An advantage of the invention is the incorporation of field level access rights into the data structure to accommodate the integration with third party systems and provide security against data from mobile sources.

An advantage is the simultaneous accommodation of both dynamic data elements and data elements that by nature have low hit rates or are large in volume. Last should be available and treated like normal data, however, replication should only happen on demand.

An advantage is also the ability to facilitate client development, like mobile applications, by creating a new consolidated view of the data source(s) that makes the structure easily understandable, easy to implement, robust and invulnerable to changes in backend or front end structure changes.

Added to this, the present invention allows to simplify usage and maximize availability of data and reduce transfer costs through efficient push-services for any type of data.

An advantage is the ability to deliver content through an optimized push service to devices that do not inherently accommodate this functionality. A further advantage is also the ability to avoid system interruption during installation, implementation and setup of data integration and mobilization processes.

Another advantage is also the ability to offer flexibility and automatic integrity during readjustment of a initial implementation of mobility solutions. This allows fast response times in accommodating changing demands of individual users.

An advantage is also that the system is implemented and operated parallel to the existing systems and does not influence or displace their functionality. This allows for ad-hoc changes as well as trial and error development and a trouble free de-installation.

Through the combination of the above features, the system advantageously provides users with a simple, cost-effective and all-inclusive solution for their mobilization, integration, consolidation and replication needs.

BRIEF DESCRIPTION OF THE DRAWINGS

As aforementioned a key advantage of the present invention is the provision of a highly flexible and easily implementable system for integrating, consolidating, replicating and/or mobilising data, which may also reside on legacy systems. Therefore, the following presented preferred and alternative embodiments constitute only a small selection of possible implementations. They will now be described with reference to the attached figures, wherein:

FIG. 9 indicates the table structure according to the present invention used to store the replication data in the Private Data Store;

FIG. 10 indicates the table structure according to the present invention used to store the database connection settings;

FIG. 11 indicates the table structure according to the present invention used to store the selected table definitions for replication;

FIG. 12 indicates the table structure according to the present invention used to store the user/device definitions;

FIG. 13 indicates the table structure according to the present invention used to store the field level access rights per user;

FIG. 14 indicates the table structure according to the present invention used to store the field definitions;

DETAILED DESCRIPTION

Figure 1:
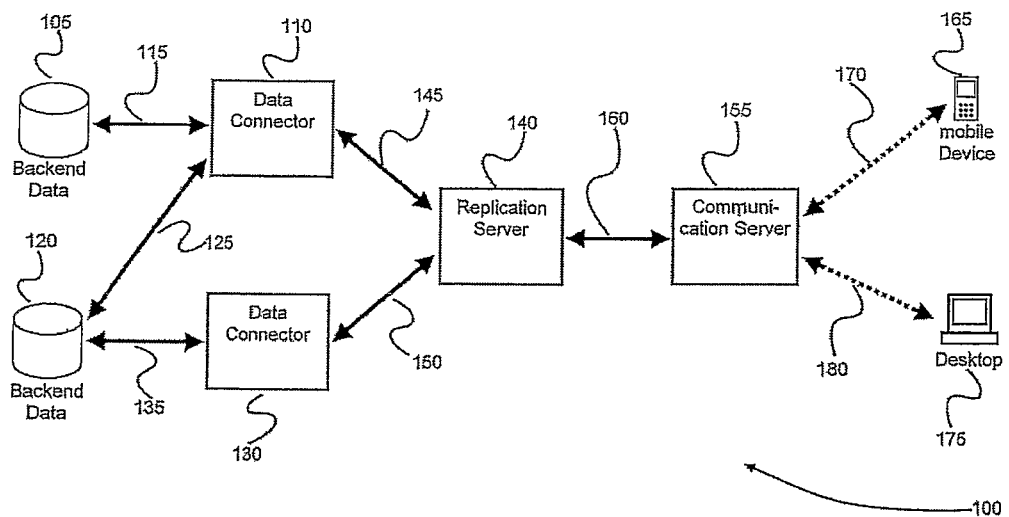
FIG. 1 shows an overview of a system according to the present invention outlining its means of implementation, components and means of communication.

Reference will now be made in detail to the present invention, supplemented by exemplary drawings. Where ever the term replication is used, it may also represents one or more of integration and consolidation of data sources and the delivery and receipt of data in a distributed, mobile manner.

Where ever encryption routines are mentioned, it is also implied that other encryption solutions may be used, such as RSA, RSA-E, RSA-S, ELG-E, DSA, ELG, 3DES, CAST5, BLOWFISH, AES, AES192, AES256, TWOFISH.

Where ever compression routines are mentioned, it is also implied that commercial compression routines may be implemented, such as Lempel-Ziv or LZ77, bzip2, or zip compression.

Where ever a communication link, also referred to as LAN connection, a wire-based or wireless communication link is indicated in the description or in any of the Figures, any wire-based or wireless communication, e.g., wire-based or wireless IP communication, WLAN, Bluetooth, etc. may be implemented as an alternative, even if it is not expressly indicated in the drawings, e.g., a Bluetooth connection between the Replication Server and a Data Connector on a monitoring system in a production plant.

Where ever the specification or the drawings refer to mobile/remote user, mobile/remote device, input/output device, mobile/remote client, connected device being connected to a Communication Server, all kind of I/O devices may form the devices listed above, such as mobile (cellular) phones, smart phones, PDAs (Personal Digital Assistants), (sub-)notebooks, laptops, desktops, servers, game consoles, bar-code devices, such as bar-code readers, sensors, such as thermometer, barometers etc., IP-enabled home appliances, IP-enabled production machinery, automobiles, car radios, navigation systems, automotive devices. It is acknowledged that the variety of devices functioning as I/O devices in the context of the present invention is only limited by the ability of such devices to communicate with the respective Communication Server. An IP-connection (Internet Protocol) is currently preferred, however, any other kind of connection could be used instead.

Where ever a transmission between an input/output device and a Communication Server is shown, this transmission can be either a communication on-demand or a pushed communication, even if this is not explicitly shown in the drawings or explicitly mentioned in the specification.

Pushed communication, push communication or push service is a way of transmitting data, wherein the transmission is initiated by the source, i.e., the sending side, and not by the target, i.e., the receiving side.

The system principally includes three components, namely the Replication Server, the optional Data Connector and the optional Communication Server. The essential component to the system is the Replication Server. Together with one or many Replication Servers, any number of the other components can make up a functioning system, which can be administered through one or many administrative interfaces. Any combination and number of the above components is feasible as long as it obeys the following rules:

(i) Backend data sources can only be connected to Data Connectors; a direct connection is preferred; many backend data sources can be connected to one Data Connector and vice versa;

(ii) One Data Connector can only be connected to one Replication Server; a Replication Server, however, may be connected to more than one Data Connector;

(iii) A Communication Server can not be directly connected to a Data Connector;

(iv) Input/output devices can only be connected to the system via a Communication Server; many input/output devices can be connected to one Communication Server;

(v) One Communication Server can only be connected to one Replication Server; a Replication Server, however, may be connected to more than one Communication Server;

(vi) A Communication Server can not be directly connected to another instance of itself;

(vii) A Data Connector can not be directly connected to another instance of itself.

Each I/O device is enabled to communicate with a Communication Server of a system as described above. The communication functionality may be provided by, e.g., HTTP (Hypertext Transfer Protocol)- or WAP (Wireless Access Protocol)-based browser interface, or a custom developed application, also referred to as client application.

Since it is an advantage of the present invention to provide implementation flexibility, by nature, all possible implementations cannot be demonstrated by the drawings. The following drawings, therefore, represent a selection of preferred implementation possibilities.

FIG. 1 shows an overview of a system 100 according to the present invention outlining its means of implementation, components and means of communication. The system 100 includes a first backend data 105 connected to a first Data Connector 110 via a first communication link 115. A second backend data 120 is connected to the first Data Connector 110 via a second communication link 125 and to a second Data Connector 130 via a third communication link 135. Both, the first Data Connector 110 and the second Data Connector 130 are linked to a Replication Server 140 via a fourth communication link 145 and a fifth communication link 150, respectively. The Replication Server 140 is connected to a Communication Server 155 via a sixth communication link 160. The Communication Server 155 itself is connected on one hand to a mobile device 165 via a seventh communication link 170 and, on the other hand, to a desktop 175 via an eighth communication link 180.

The first backend data 105 and/or the second backend data 120 may be formed of any kind of structured data that is accessible. The accessibility may advantageously be provided through native software drivers, such as ODBC (open database connectivity), POP3 (post office protocol), SMTP (simple mail transfer protocol), LDAP (Lightweight Directory Access Protocol), ActiveDirectory or structured file access. Examples of data sources are Oracle Databases, Microsoft SQL, Access, Exchange, Excel, flat files, Public Mail accounts, and various others.

The mobile device 165 may, e.g., be formed by a laptop, a mobile phone or a PDA (personal digital assistant) with mobile access, e.g., through. GPRS (general purpose radio signal), UMTS (Universal Mobile Telecommunications System), Bluetooth or WLAN (Wireless Local Area Network) to the Internet or VPN (virtual private network). Any other form of IP (Internet Protocol) based wireless connection can be supported.

The desktop 175 may be formed by a personal computer with network access, e.g., through a LAN (local area network), WAN (wide area network), the Internet or a VPN (virtual private network).

The communication links 115, 125, 135, 145, 150, 160, 180 may be formed by a unidirectional and/or a bi-directional network connection, e.g., over a LAN (local area network), WAN (wide area network) or VPN (virtual private network). In certain instances this communication may also be a non-secure Internet connection, in which case the optional integrated encryption in the invention provides the necessary security.

The seventh communication link 170 may be formed by a unidirectional and/or bi-directional connection through the Internet, such as a TCP/IP connection (Transmission Control Protocol over Internet Protocol.). The Communication Server 155 has access to the Internet and is reachable either through a fixed IP address or URL (uniform resource locator), or with the intervention of an external server (not shown) over a dynamic IP address. In the latter, the current server IP address is polled by a hosted service. The mobile device 165 first connects to the hosted service, which in turn identifies it and passes the current IP address. The mobile device 165 then automatically disconnects from the hosted service and establishes a connection to the server via the now known IP address.

The Replication Server 140 is responsible for the redirection of transactions between the mobile device 165 and anyone of the first and second backend data 105, 120, the desktop 175 and the first or second backend data 105, 120 and/or the first backend data 105 and second backend data 120 and between the mobile device 165 and the desktop 175. The Replication Server 140 is also responsible for integration functions between data sources, field level transaction security pertaining to user and device access rights, and data integrity. The Replication Server 140 connects to one or many Data Connectors (e.g. the first and second Data Connector 110, 130) and one or many Communication Servers (here Communication Server 155). The Replication Server 140 may also connect to multiple distributed instances of its self (not shown).

A possible implementation may be to optimize replication between branches where each branch has a Replication Server, or the connection of two companies, each of which implement the Replication Server, for purposes of exchanging data between their respective backend systems, so that inter-company teams are enabled to work on a common data pool.

Each of the Data Connectors 110, 130 allows easy access to backend data sources. The Data Connector is configured to define subsets of existing data for purposes of mobilization and integration. As needed, new data sources may be defined. Behaviour such as replication frequency, read/write access on tables and fields, and integrity rules may be defined in each of the Data Connectors 110, 130. Both Data Connectors 110, 130 may be implemented on the same computer as the data source, on a different computer in the network, or connect to a remote data source over the Internet. One Data Connector, such as the first Data Connector 110 in FIG. 1 may connect to multiple instances as well as duplicates of backend data, here the first and second backend data 105, 120. Two Data Connectors, in FIG. 1 the first and second Data Connector 110, 130, may connect to the same backend data source, here the second backend data 120. Numerous instances of Data Connectors may also be implemented in the same system. Both Data Connectors may be implemented on the same computer system as the Replication Server or on a different computer system.

The Communication Server 155 is responsible for client access to the system. Client access may be from a mobile device, such as mobile device 165 of FIG. 1, or a personal computer, such as the desktop 175 of FIG. 1. The Communication Server 155 is responsible for user and device level access rights. The Communication Server 155 maintains transaction integrity during the communication process by ensuring data delivery. The Communication Server may be implemented on the same computer system as the Replication Server or on a different computer system.

Figure 2:
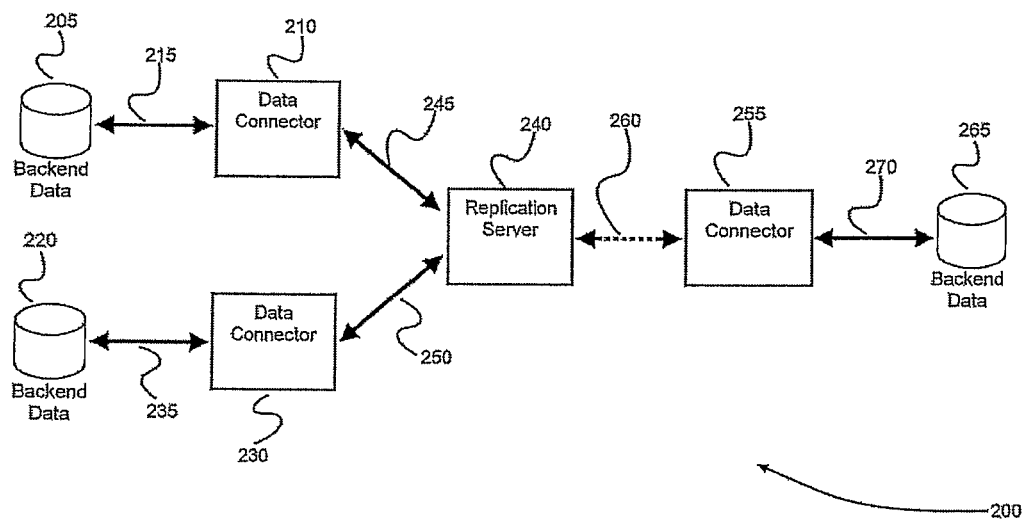
FIG. 2 displays a system according the present invention implementing a connection to multiple backend data sources, both local and distributed.

FIG. 2 displays a system 200 according the present invention implementing a connection to multiple backend data sources, both local and distributed. The system 200 includes a first backend data 205 connected to a first Data Connector 210 via a first communication link 215. A second backend data 220 is connected to a second Data Connector 230 via a second communication link 235. Both, the first Data Connector 210 and the second Data Connector 230 are linked to a Replication Server 240 via a third communication link 245 and a fourth communication link 250, respectively. The Replication Server 240 is connected to a third Data Connector 255 via a fifth communication link 260.

The third Data Connector 255 itself is connected to a third backend data 265 via a sixth communication link 270.

The communication links 215, 235, 245, 250 and 270 are formed by a bi-directional network connection over a LAN, WAN or VPN. The fifth communication link 260 is formed by a bi-directional IP (Internet Protocol) connection through the Internet.

Figure 3:
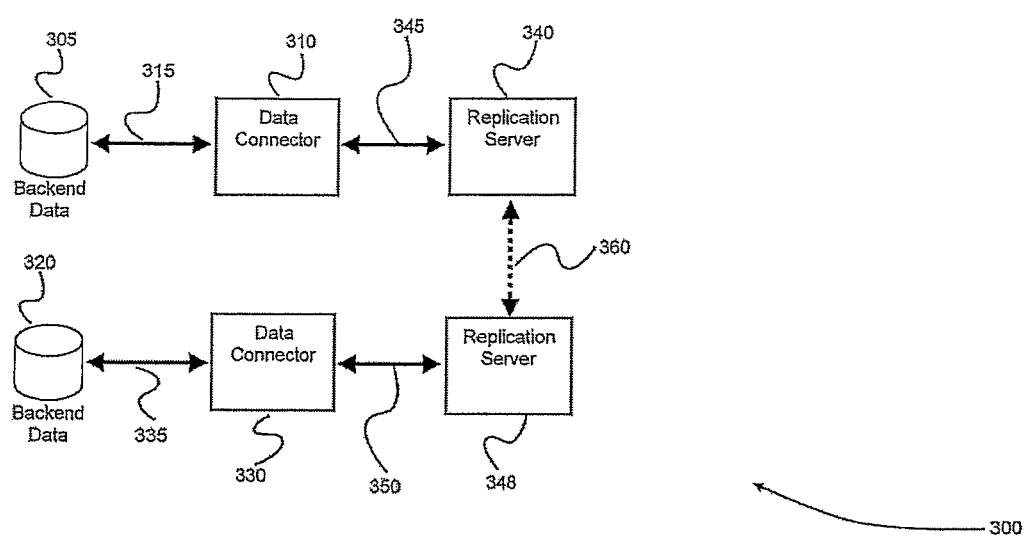
FIG. 3 shows a system according to the present invention implementing two Replication Servers.

FIG. 3 shows a system 300 according to the present invention implementing two Replication Servers. It is acknowledged that more than two Replication Servers may be provided in a system.

The system 300 includes a first backend data 305 connected to a first Data Connector 310 via a first communication link 315. A second backend data 320 is connected to a second Data Connector 330 via a second communication link 335. The first Data Connector 310 is linked to a first Replication Server 340 via a third communication link 345. The second Data Connector 330 is linked to a second Replication Server 348 via a fourth communication link 350. The first Replication Server 340 is connected to the second Replication Server 348 via a fifth communication link 360.

This structure has the advantage of producing higher availability of data if data sources are distributed. The communication links 315, 335, 345 and 350 are formed by bidirectional network connections over a LAN, WAN or VPN. The fifth communication link 360 indicates a bi-directional IP connection through the Internet, alternatively over a LAN, VPN, etc.

Figure 4:
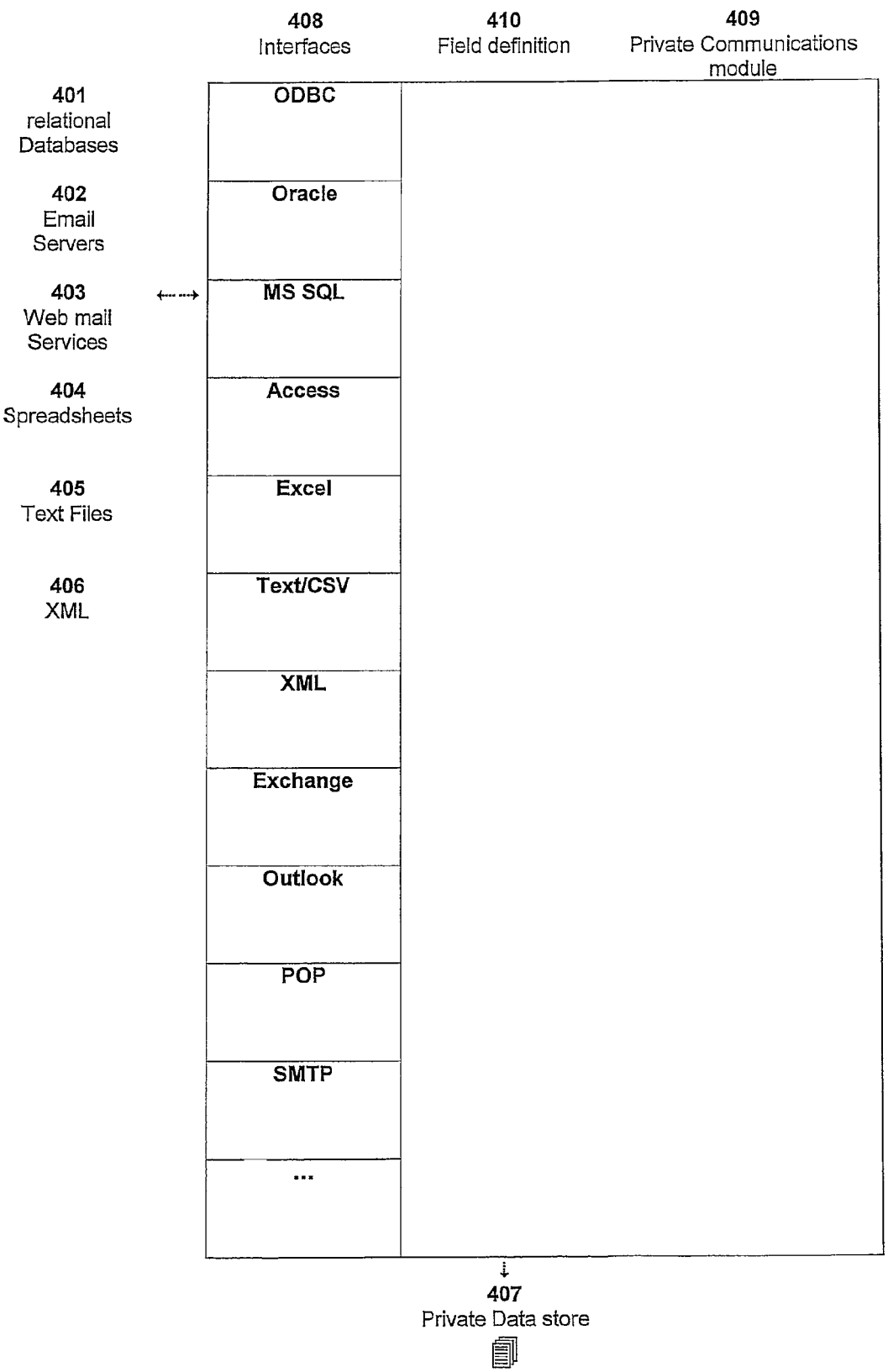
FIG. 4 highlights functional units of the Data Connector.

FIG. 4 highlights functional units of the Data Connector 400. The Data Connector 400 includes an interface 408 to various data sources. The Data Connector may be configured to automatically detect the data structures and/or available data fields from connected backend data sources. Possible backend data sources may be formed by relational databases 401, including Oracle or Access, email servers 402 including PIM Services (personal information manager), POP3 (post office protocol) and SMTP (simple mail transfer protocol), web-based mail sources 403, spreadsheets 404, structures files 405, like CSV (comma delimited) or XML (extensible markup language) 406. Through a comprehensive administration screen (not shown), many structured data sources may be defined. Furthermore, the Data Connector includes a Private Communication Module 409, which is configured to communicate with a Replication Server, and a Field Definition Module 410, being configured to allow defining subsets of fields to be published for replication, through a GUI (Graphical User Interface). The Field Definition Module 410 is also used for defining integrity and replication rules on table and field level. Furthermore, a private data store 407 is provided for facilitating efficient replication against non-intelligent data sources, pre-structuring data in a proprietary format and allowing accessibility of data during backend downtime.

As far as possible, the Data Connector analyses backend data sources to establish integrity rules and maintains them during the replication process to maintain data integrity. These integrity rules may be adjusted or expanded upon through an Administration screen.

Figure 5:
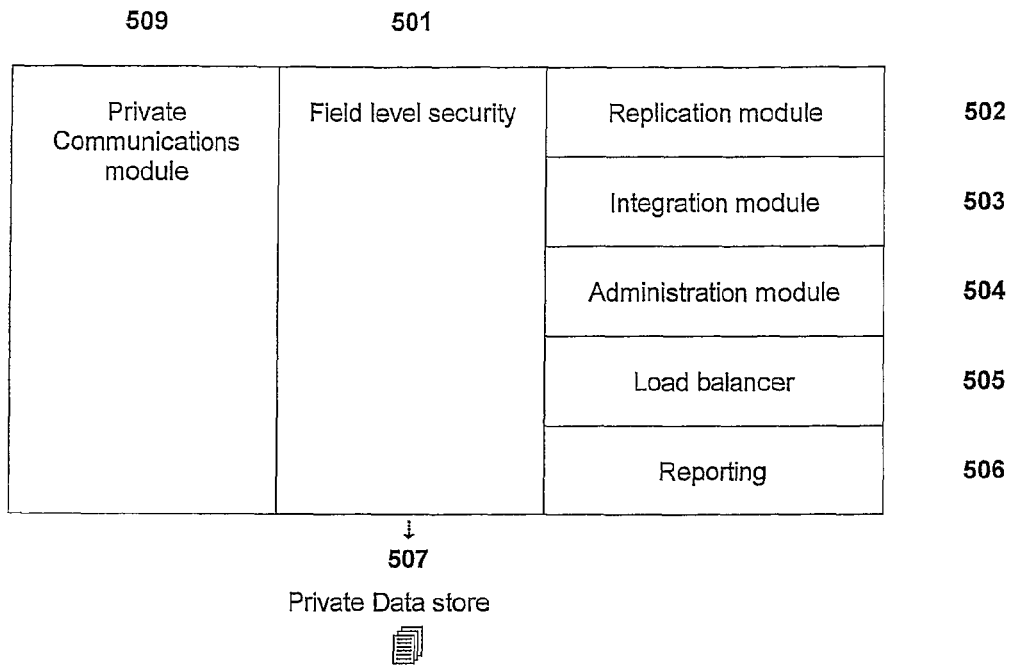
FIG. 5 illustrates the components of a Replication Server.

FIG. 5 illustrates the components of a Replication Server 500. The Replication Server 500 includes a Field Level Security module 501, a replication module 502, an integration module 503, an administration module 504, a load balancer 505, a reporting module 506, a private data store 507 and a private communication module 509.

The Private Communication Module 509 is responsible for communication with Data Connectors, Communication Servers and other Replication Servers. The private data store 507 is provided to take care of the total data load. The private data store 507 is also responsible for transaction handling during validation and conflict management.

The Field Level Security module 501 is configured to check user and device rights on field level before the replication is initiated. The Replication Module 502 is provided for channeling data changes throughout the system. The Integration Module 503 includes GUI (graphical user interface) (not shown), through which the integration rules between data sources may be defined. The Administration module 504 is enabled to define which connections, user access and server states are monitored. This advantageously allows the definition of detailed access rules down to field level per user, while making the distinction between access types. E.g., a user may change backend data while accessing the system from the LAN local area network or VPN virtual private network, but not from a mobile device or over the Internet.

Maintaining rules with the aid of defined User group-Rules simplifies the management of individual users, yet offering the flexibility of fine-tuning individuals as needed.

The Load Balancing module 505 is responsible for efficient transaction handling between multiple Replication Servers, connected Data Connectors and Communication Servers. The Reporting module 506 informs where problems during the replication process are to be resolved.

Figure 6:
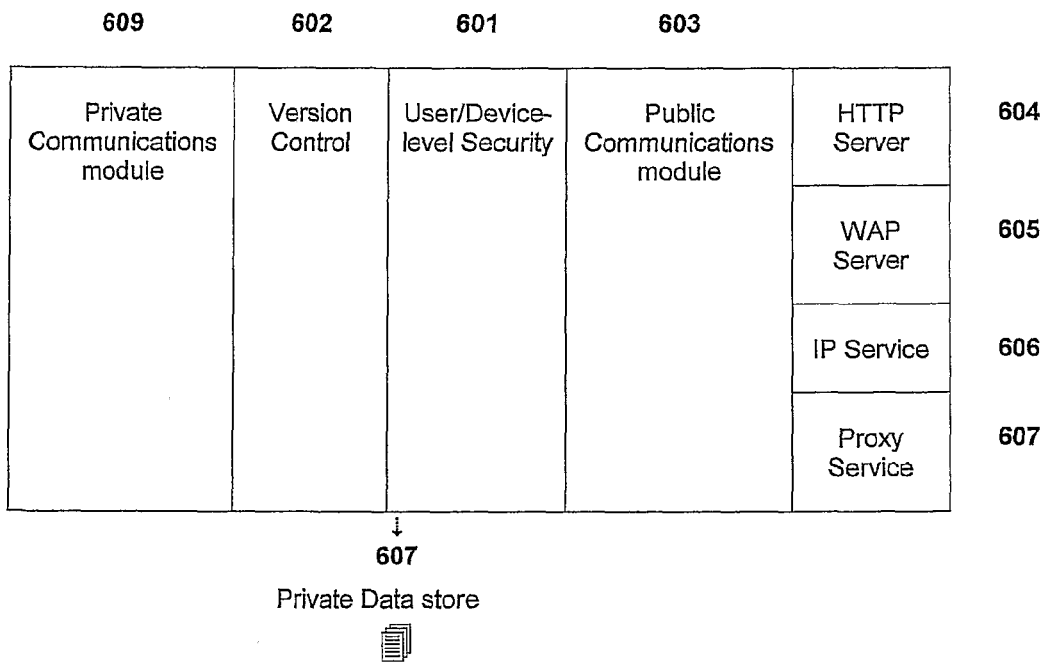
FIG. 6 represents the components of a Communication Server.

FIG. 6 represents the components of a Communication Server 600. The Communication Server 600 includes a user/device-level security module 601, a version control module 602, a public communications module 603, an HTTP (Hypertext Transfer Protocol) Server module 604, a WAP (Wireless Access Protocol) Server module 605, an IP Service module 606, a Proxy Service module 607, a private data store 608 and a private communications module 609.

The Private Communication Module 609 is configured to communicate with one Replication Server. The private data store 608 is provided for replicated data intended for or from users and devices managed by the appropriate Communication Server. The user/device-level security module 601 is responsible for user and device access security. Before transactions are accepted, this module validates the rights the connected user or device has. It is important to note that the same user may have divergent rights according to the device he/she connects with. E.g., the user may be allowed to change product pricing from a desktop computer in the local area network, but not from his mobile device via an Internet connection.

The Public Communications module 603 provides various communication means to the system. A Web Server 604 for data access over a browser. Custom HTML pages may be configured for this interface, mainly intended for reporting, however, many other implementations are feasible. A WAP server 605 for browser access from mobile devices, with the same intentions and possibilities as Web Server. The IP Services 606 provide IP communication through predefined ports. This is the standard intended form of client communication with the system. The Proxy module 607 accommodates communication though Proxy servers. The version control module 602 handles the version control of the client application on the mobile device.

Figure 7:
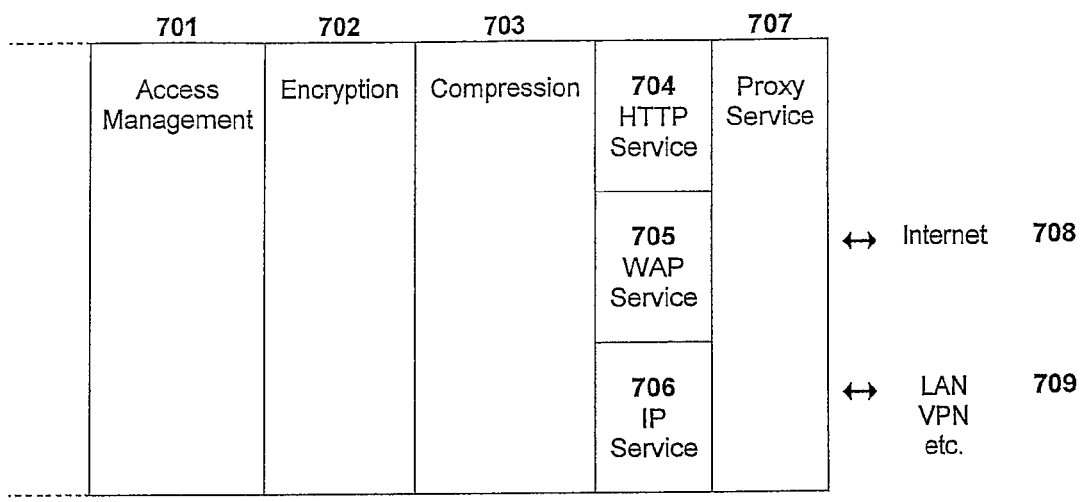
FIG. 7 displays a detailed view of the Public Communications module according to the present invention as seen in FIG. 6.

FIG. 7 displays a detailed view of the Public Communications module 700 according to the present invention as seen in FIG. 6, item 603. The Public Communications module 700 includes an access management module 701, an encryption module 702, a compression module 703, a HTTP Service module 704, a WAP Service module 705, an IP Service module 706, an Proxy Service module 707, an interface to the Internet 708 and an interface to LAN, VPN etc. 709. The interfaces may be implemented by respective connection to the Internet, LAN, VPN, etc.

The Proxy Service module 707 is the interface for Proxy handling. The HTTP Service module 704 and the WAP Service module 705 are used for the transmission of data.

These two services can deliver custom interfaces to the client browser. The IP Service module 706 implements the Socket service, the preferred communications route for replication.

The compression module 703 is responsible for compression during data transfer. The compression algorithm is proprietary to the system. However, any other compression algorithms may be used, e.g., the ones listed above. The encryption module 702 is responsible for encryption during the communications process. An encryption system is implemented in the system, but may be substituted by commercial alternatives, e.g., the ones listed above. The encryption uses a public-private key implementation with a variable encryption level, e.g. 8 or 128 bit.

The access management module 701 is responsible for access management. This component validates user and device access rights, monitors client device states such as memory requirements, and validates transactions.

Figure 8:
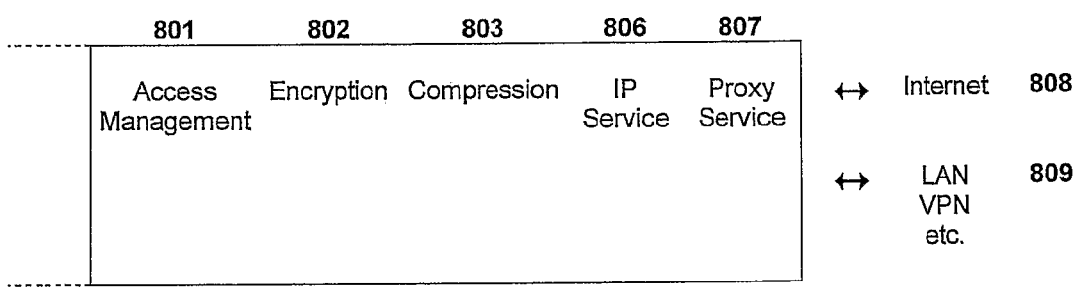
FIG. 8 illustrates a Private Communications module as implemented for communication purposes between Replication Server from FIG. 5, Communication Server from FIG. 6 and Data Connector from FIG. 4.

FIG. 8 illustrates a Private Communications module 800 as implemented for communication between Replication Server FIG. 5, item 509, Communication Server FIG. 6, item 609 and Data Connector FIG. 4, item 409. The Private Communications module 800 includes an access management module 801, an encryption module 802, a compression module 803, an IP Service module 806, a proxy service module 807, and interfaces to the Internet 808 and LAN, VPN etc. 809, respectively.

The interfaces 808 and 809 may be implemented by connections to the Internet, LAN, VPN, etc. The proxy service module 807 is the interface for Proxy handling. The IP Service module 806 implements the Socket service, the preferred communications route for replication. The compression service module 803 is responsible for compression during data transfer. The compression algorithm is proprietary to the system, others may be used as mentioned above.

The encryption module 802 is responsible for encryption during the communications process. An encryption system is implemented in the system, but may be substituted by (commercial) alternatives as listed above. The encryption uses a public-private key implementation with a variable encryption level, e.g. 8 or 128 bit.

The access management module 801 is responsible for access management. This component validates module access rights, monitors connection states, and validates transactions.

FIG. 9 indicates the table structure according to the present invention used to store the replication data in the Private Data Store. Each record represents the contents of a field in the backend system. The average overhead created in this way is balanced out by the fact that only the fields and selections specified for replication are maintained in this manner. Furthermore, the advantages that this scheme brings in flexibility during the integration of diverse data sources, as well as control during replication, justifies such a structure. The key to an efficient replication routine is an index in the following fashion: Unique Database Identifier, Unique Table Identifier, Timestamp of the change, Changed By identifier, Unique Field Identifier. The Virtual Field flag indicates whether the actual data represents large data volumes that should only be replicated by reference. The actual data would then be fetched from the backend source on demand. Typical implementations would be for large data objects or email text and attachments. It is acknowledged that a preferred selection of fields is shown. Other fields, however, may be added as needed or are in use for extended functionality.

FIG. 10 indicates the table structure according to the present invention used to store the database connection settings. These include replication rules. Fields are provided for the following data: a Unique Database Identifier, a Backend data Source connection string, a Backend data Location, Global Access Rights to the database, a Backend Name of the data source, a Server internal Name of the data source, Global Replication Rules of the database, and a Data connector ID identifying ownership. It is acknowledged that a preferred selection of fields is shown. Other fields, however, may be added as needed or are in use for extended functionality.

FIG. 11 indicates the table structure according to the present invention used to store the selected table definitions for replication. These include replication rules. Fields are provided for the following data: a Unique Table Identifier, a Unique Database Identifier, a Backend Table Name, a Server internal Table Name, and Global Replication Rules for the table. It is acknowledged that a preferred selection of fields is shown. Other fields, however, may be added as needed or are in use for extended functionality.

FIG. 12 indicates the table structure according to the present invention used to store the user/device definitions. These include allowable device and connection types per user as well as specifying access times. Fields are provided for the following data: a Unique User Identification, Global Access rights for read/write/delete access, a Device Type, a Connection Type, and Access Times. It is acknowledged that a preferred selection of fields is shown. Other fields, however, may be added as needed or are in use for extended functionality.

FIG. 13 indicates the table structure according to the present invention used to store the field level access rights per user. Fields are provided for the following data: a Unique User Identification, a Unique Field Identification, and Global Access rights for read/write access. It is acknowledged that a preferred selection of fields is shown. Other fields, however, may be added as needed or are in use for extended functionality.

FIG. 14 indicates the table structure according to the present invention used to store the field definitions. Fields are provided for the following data: a Unique Field Identification, a Unique Database Identification, a Unique Table Identification, a Backend Field Name, a Server internal Field Name, a Field Data Type, Transformation Rules for data type conversion, Global Replication Rules, a Flag to specify a Virtual field, a Flag specifying access applicable to connection type, Read/write access rules for non secure connections, Read/write access rules for secure connections, a Default field Value, a Integrity Place Holder, and a Flag indicating if field is indexed. This represents the selected subset of fields used in the replication process. It contains comprehensive transformation rules to allow divergent data type to be conform during the integration process. It is acknowledged that a preferred selection of fields is shown. Other fields, however, may be added as needed or are in use for extended functionality.

The next three figures focus on the inventive method. The method for managing transmission of transactions between its individual components according to the present invention includes the following steps. Upon receiving data, the receiving component first validates the access rights of the sending component. For a legal connection the receiving component then collects the received data and verifies transaction integrity. The receiving component then decides on the destination component, checks availability of the destination component, logs on to this component, and upon successful connection sends the transaction to the destination component.

The method may further include the step of maintaining the delivery status and resending the transaction if necessary, after the transaction to the destination component has been sent. The method may further include steps related to compression and encryption.

Figure 15:
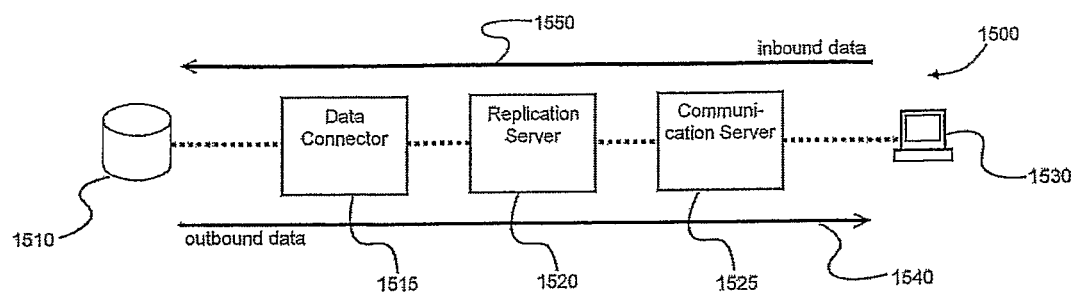
FIG. 15 illustrates the transactions in a system according to the present invention.

FIG. 15 illustrates the transactions in a system 1500 according to the present invention. Outbound transactions transporting backend data from a backend data source 1510, over a Data Connector 1515, over a Replication Server 1520 and over a Communication Server 1525 to an input/output device 1530 (arrow 1540). Inbound transactions transporting data from the input/output device 1530 over the Communication Server 1525, over the Replication Server 1520, over the Data Connector 1515 to the backend data source 1510 (arrow 1550).

Figure 16:
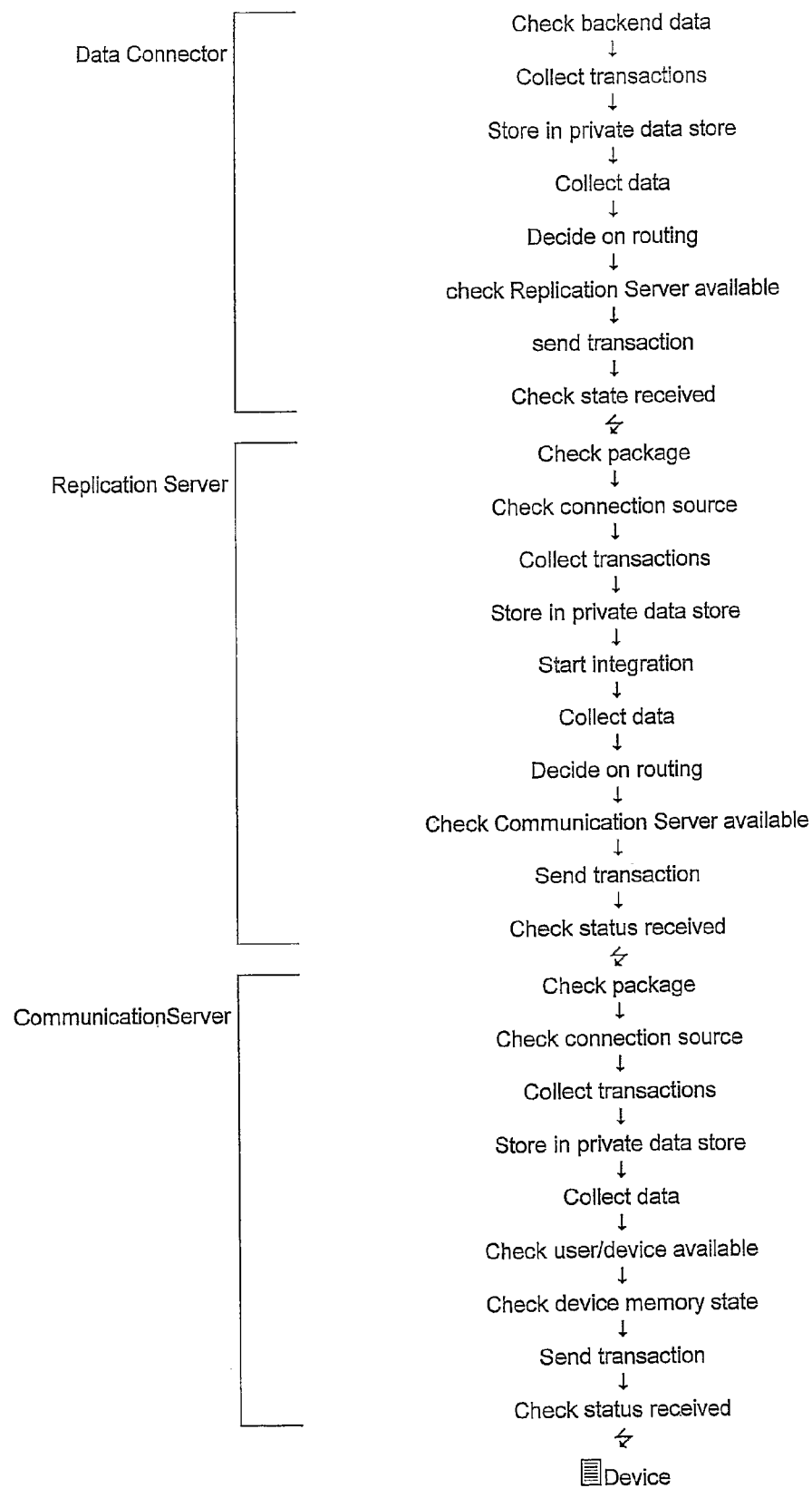
FIG. 16 describes the processes according to the present invention that outbound transactions follow.

FIG. 16 describes the processes according to the present invention that outbound transactions follow. The following steps are performed in the Data Connector Check backend data, Collect transactions, Store in private data store, Collect data, Decide on routing, check Replication server available, send transaction, Check state received. The following steps are performed by the Replication Server: Check package, Check connection source, Collect transactions, Store in private data store, Start integration, Collect data, Decide on routing, Check Communication server available, Send transaction, Check status received. And the following steps are performed in the Communication Server Check package, Check connection source, Collect transactions, Store in private data store, Collect data, Check user/device available, Check device memory state, Send transaction, and Check status received.

Figure 17:
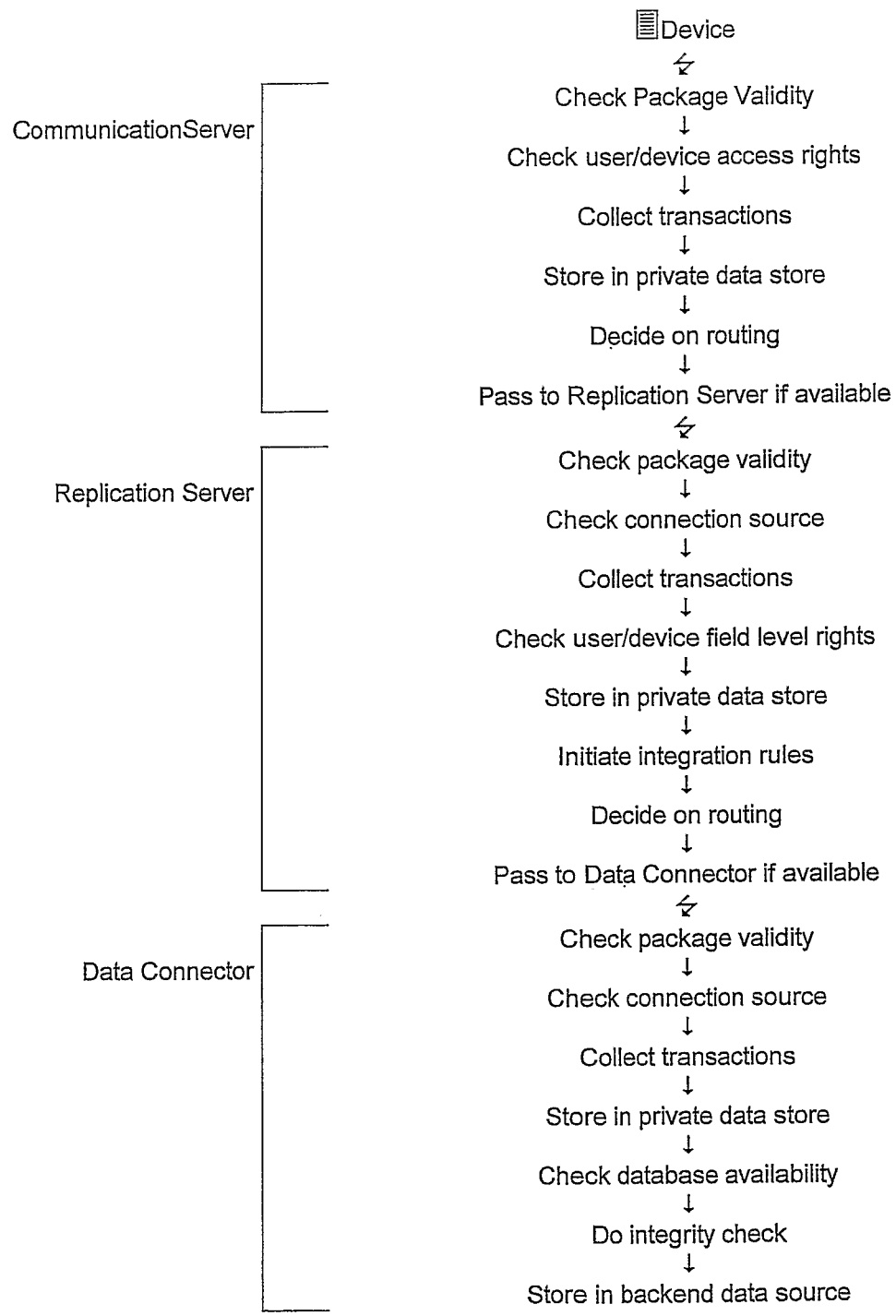
FIG. 17 describes the processes according to the present invention that inbound transactions follow.

FIG. 17 describes the processes according to the present invention that inbound transactions follow. The following steps are performed in the Communication Server: Check Package Validity, Check user/device access rights, Collect transactions, Store in private data store, Decide on routing, Pass to Replication Server if available. The following steps are performed in the Replication Server: Check package validity, Check connection source, Collect transactions, Check user/device field level rights,
Store in private data store, Initiate integration rules, Decide on routing, Pass to Data connector if available. And the following steps are performed in the Data Connector: Check package validity, Check connection source, Collect transactions, Store in private data store, Check database availability, Do integrity check, and Store in backend data source.

Figure 18:
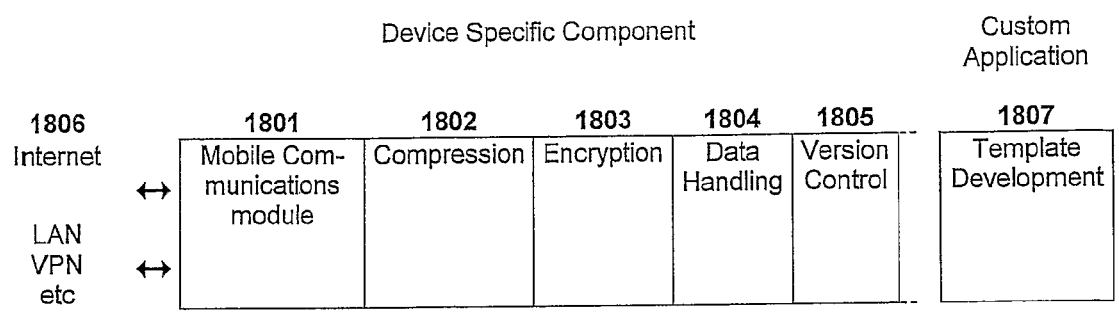
FIG. 18 describes the client device modules implementing the functionality on the mobile device according to the present invention.

FIG. 18 describes the client device modules 1800 implementing the functionality on the mobile device according to the present invention. The mobile device may include all kind of I/O devices, such as mobile (cellular) phones, smart phones, PDAs (Personal Digital Assistants), PocketPC and PalmOS based PDAs and Symbian based, JAVA enabled mobile phones, (sub-)notebooks, laptops, desktops, servers, bar-code devices, such as bar-code readers, sensors, such as thermometer, barometers etc., IP-enabled home appliances, IP-enabled production machinery, automobiles, car radios, navigation systems, automotive devices. It is acknowledged that the variety of devices functioning as I/O devices in the context of the present invention is only limited by the ability of such devices to communicate with the respective Communication Server. An IP-connection (Internet Protocol) is currently preferred, however, any other kind of connection could be used instead.

The client device modules include a first group of modules, namely, device specific modules, and a second group of modules, namely, custom application specific modules. The device specific modules include a mobile communications module 1801, a compression module 1802, an encryption module 1803, a data handling module 1804, and a version control module 1805. The mobile communications module 1801 is connectable to the Internet and LAN, VPN via respective interfaces 1806. The custom application specific modules include a template development module 1807. These components may be installed online.

The communications module 1801 is responsible for handling communication. Furthermore it provides access to the compression module 1802, the encryption module 1803 and transactions and data storage (not shown). Additionally, it provides access to the version control module 1805 of the client application.

The client application is developed based on predefined templates, which manage communications and data security through the Communications module 1801 and encrypted data storage and handling module 1804 on the mobile device. The development of the client application is independent of the target device and operating. Only display sizes need to be considered.

The client application will then be compiled for the desired target device or operating system and is ready for delivery. Mobile Applications may optionally have two levels of password security. Application access and specific password-on-demand data access for virtual fields. Typical use is a mobile email client with added password request on text retrieval for each individual message.

The following figures illustrate the numerous implementation possibilities and accompanying flexibility according to the concepts of the present invention.

Figure 19:
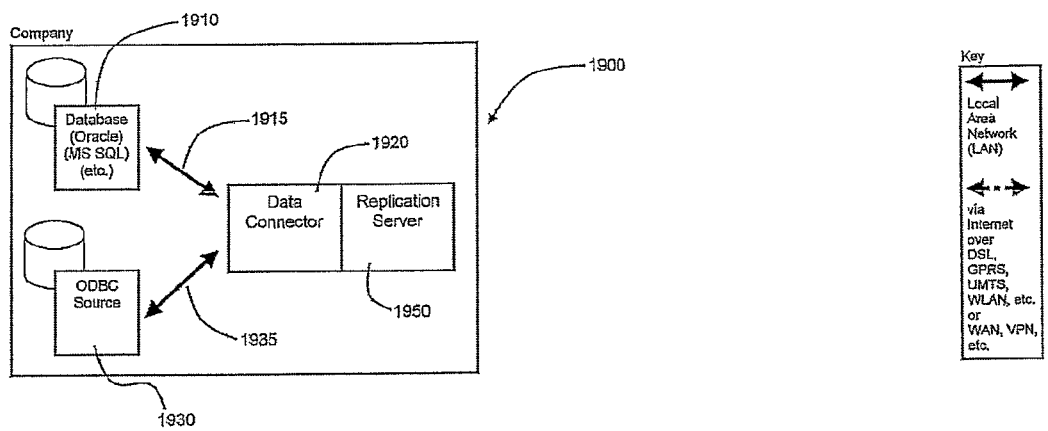
FIGS. 19, 20 and 21 illustrate possible means of connecting to local data sources for integration, consolidation, replication and possible mobilization according to the present invention.
Figure 20:
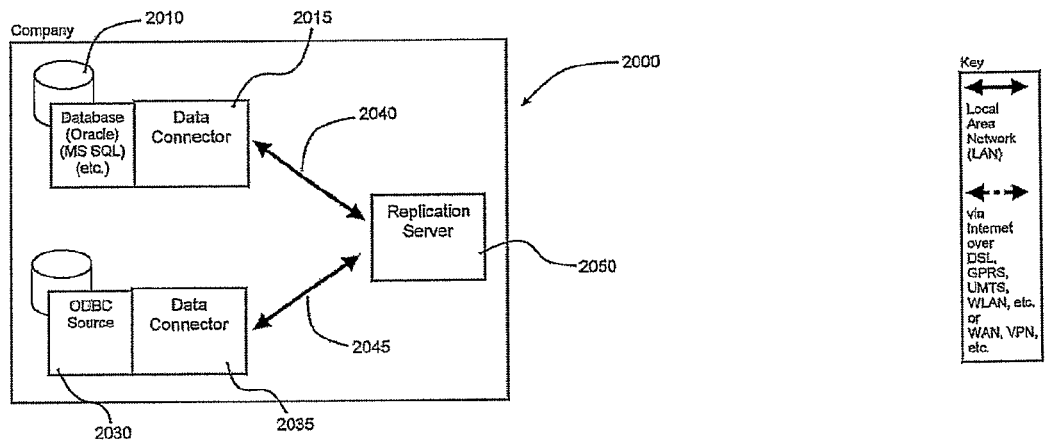
Figure 21:
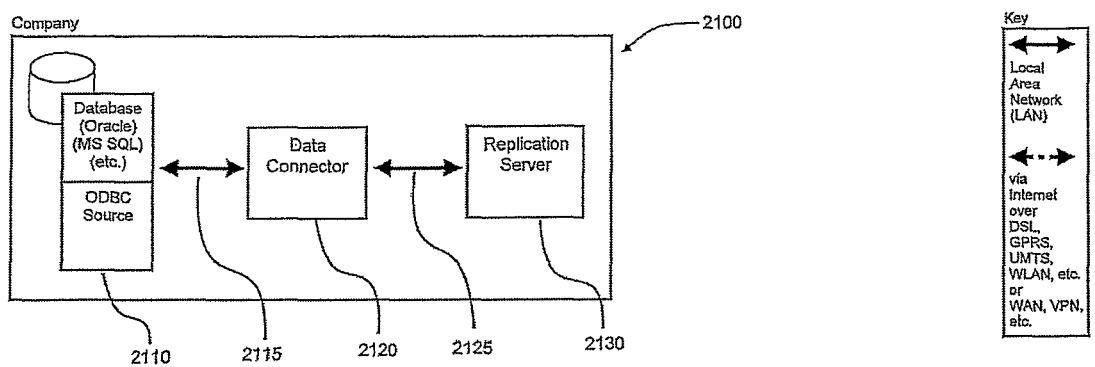

FIGS. 19, 20 and 21 illustrate possible implementations of connecting to local data sources for integration, consolidation, replication and possible mobilization according to the present invention.

FIG. 19 illustrates a system 1900 connecting to one or more data sources in the local area network for integration, replication, consolidation and possible mobilization purposes. A first data source 1910 is connected via a first LAN connection 1915 to a Data Connector 1920. A second data source 1930 is connected via a second LAN connection 1935 to the Data Connector 1920. On the same computer system (not shown) as the Data connector, a Replication Server 1950 is installed, able to communicate with the Data Connector 1920. Examples for such a configuration would be the possible integration and status updates between ERP-(Enterprise Resource Planning), Stock- and Production system without interface programming. This would be implemented by installing the components on a single computer in the network. Advantages are a simple installation and maintenance.

FIG. 20 shows a system 2000 for data integration. A first data source 2010 is directly connected to a first Data Connector 2015, both installed on the same computer system (not shown). A second data source 2030 is directly connected to a second Data Connector 2035, both running on the same computer system (not shown), which may be different from the computer system the first Data Connector 2015 is running on. Both, the first Data Connector 2015 and the second Data Connector 2035 are connected via a first LAN connection 2040 and a second LAN connection 2045 to a Replication Server 2050, respectively. For the same purpose as in FIG. 19, FIG. 20 has each Data Connector 2015, 2035 installed on the computer system running a data server and the Replication Server installed on a separate machine. Advantages would be reduced network traffic through optimized replication between the Data Connectors 2015, 2035 and the Replication Server 2050.

FIG. 21 shows a system 2100 for data integration. A data source 2110 is connected via a first LAN connection 2115 to a Data Connector 2120. The Data Connector 2120 is connected via a second LAN connection 2125 to a Replication Server 2130. For the same purpose as in FIG. 19, FIG. 21 illustrate the components and data sources each residing on separate machines (not shown). This is a further indication of the flexibility of implementation.

Figure 22:
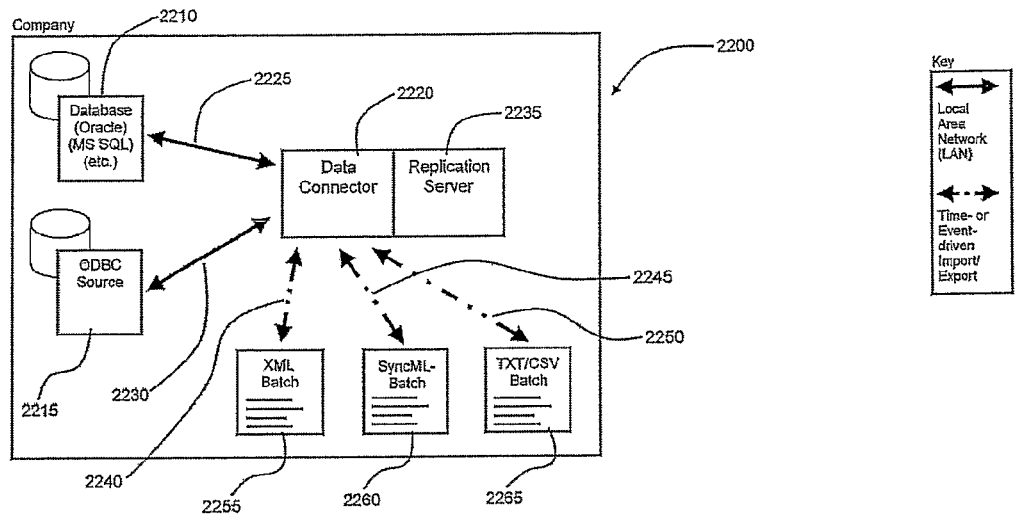
FIGS. 22, 23 and 24 illustrate possible means of connecting to batched and remote data sources for integration, replication and possible mobilization according to the present invention.
Figure 23:
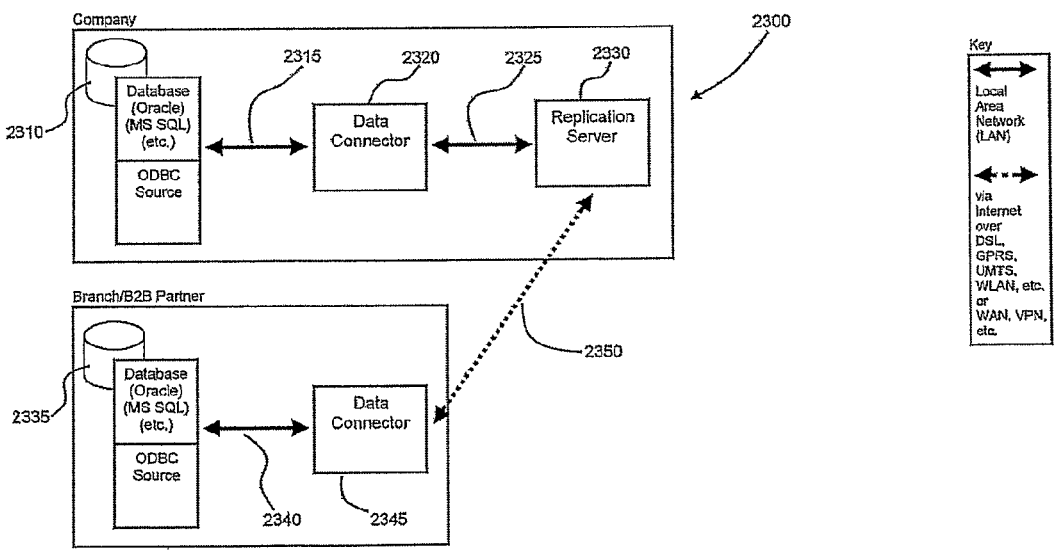
Figure 24:
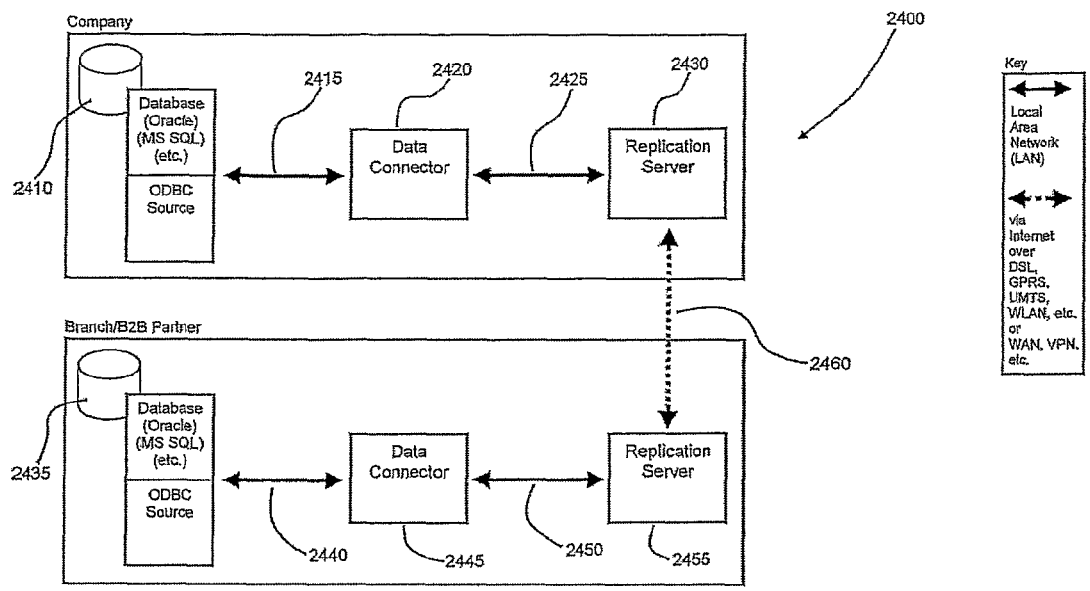

FIGS. 22, 23 and 24 illustrate possible means of connecting to batched and remote data sources for integration, replication, consolidation and possible mobilization according to the present invention.

FIG. 22 illustrates system 2200 for the import and export of batch delivered data from other systems. A first data base 2210 and a second data base 2215 are connected to a Data connector 2220 via a first LAN connection 2225 and a second LAN connection 2230, respectively. A Replication Server 2235 is installed on the same computer system (not shown) as the Data Connector 2220, both can communicate with each other. A first interface 2240 for time or event driven import/export is provided for the Data Connector 2220 to access an XML-batch file 2255. A second interface 2245 for time or event driven import/export is provided for the Data Connector 2220 to access an TXT/CVS-batch file 2260. A third interface 2250 for time or event driven import/export is provided for the Data Connector 2220 to access an SyncML-batch file 2265. Examples of use for this arrangement would be the integration with $3^{rd}$ party system that deliver and accept content only as flat files, XML, etc. For implementation, the import/export structures are defined in the Data Connector. Import/export may be timed or event driven.

FIG. 23 shows a system 2300 for the purpose of integration and replication between remote systems. A first data base 2310 is connected via a first LAN connection 2315 to a first Data Connector 2320, which itself is further connected via a second LAN connection 2325 to a Replication Server 2330. All of those components relate to one site, e.g., a company. A second data base 2335 is connected via a third LAN connection 2340 to a second Data Connector 2345. Those components relate to a different site, e.g., a branch or a B2B (business-to-business) partner. The second Data Connector 2345 is connected to the Replication Server over the Internet, a DSL (Digital Subscriber Line), GPRS, UMTS, WLAN, WAN or VPN or any other IP-capable connection 2350, in order to connect both sites. Examples of use would be the exchange of data between branches or with other companies. For implementation, the head office installs the Replication Server which communicates with a remote Data Connector. Administration may be centralized, or be localized to the Data Connector. Advantages are the real-time integration and replication of remote systems with centralised administration.

For the same purpose as in FIG. 23, FIG. 24 shows an example of a system 2400 where both remote locations implement the Replication Servers which communicate with each other. A first data base 2410 is connected via a first LAN connection 2415 to a first Data Connector 2420, which itself is further connected via a second LAN connection 2425 to a first Replication Server 2430. All of those components relate to one site, e.g., a company. A second data base 2435 is connected via a third LAN connection 2440 to a second Data Connector 2445, which itself is further connected via a fourth LAN connection 2450 to a second Replication Server 2455. Those components relate to a different site, e.g., a branch or a B2B (business-to-business) partner. The second Replication Server 2455 is connected to the first Replication Server 2430 over the Internet, a DSL (Digital Subscriber Line), GPRS, UMTS, WLAN, WAN or VPN or any other IP-capable connection 2460, in order to connect both sites. Administration may be centralized, or be localized to the Data Connector. Advantages are real-time integration and replication of remote systems, and better load balancing. Specifying data flow according to what stays local and what is passed to remote system, leads to optimized replication.

Figure 25:
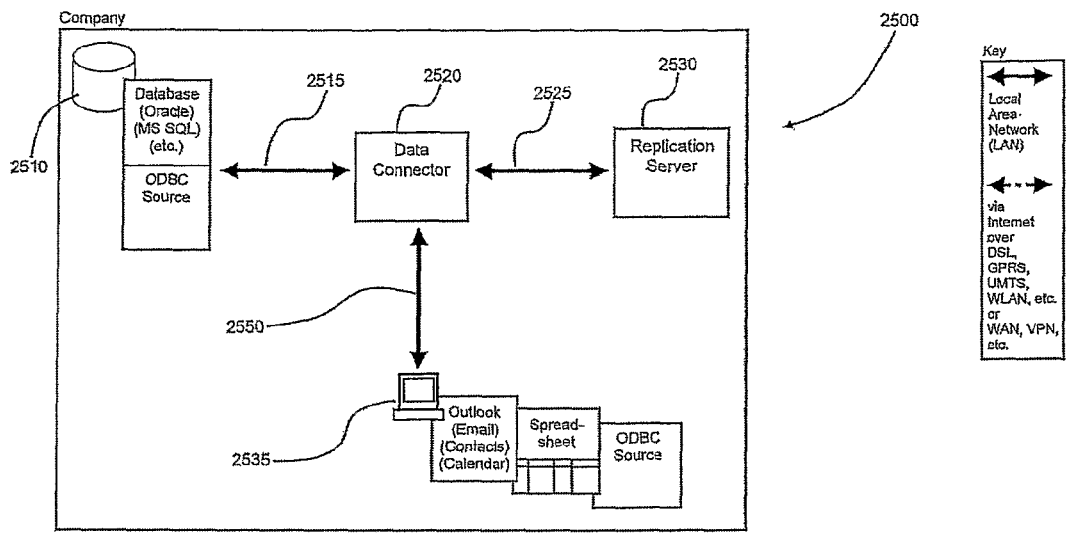
FIGS. 25, 26 and 27 illustrate possible means of connecting to personal data sources as well as email, calendar, contact data and any other content of PIM systems (Personal Integration Manager) for integration, replication and possible mobilization according to the present invention.
Figure 26:
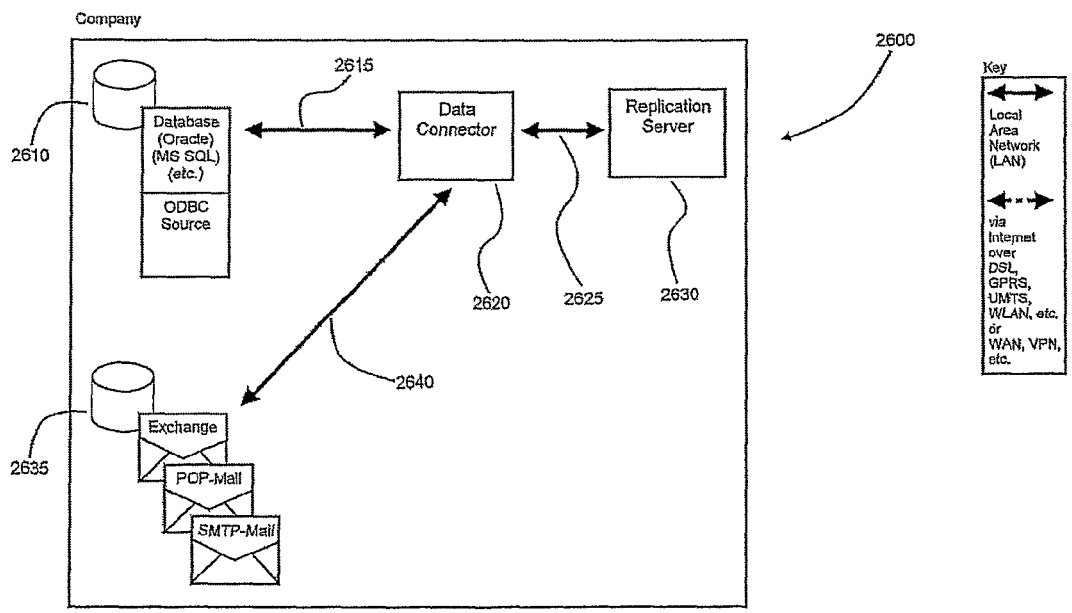
Figure 27:
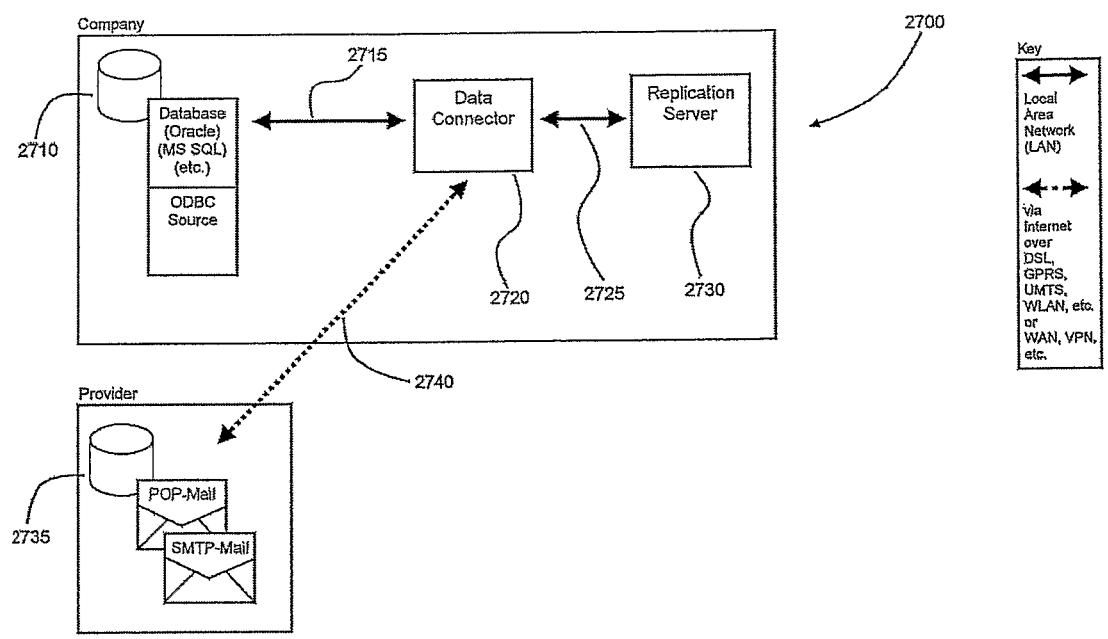

FIGS. 25, 26 and 27 illustrate possible means of connecting to personal data sources as well as email, calendar, contact data and any other content of PIM systems (Personal Information Manager) for integration, replication, consolidation and possible mobilization according to the present invention.

FIG. 25 shows a system 2500 for integrating with personal data on desktops. The system 2500 includes a data base 2510 connected via a first LAN connection 2515 to a Data Connector 2520, which is connected via a second LAN connection 2525 to a Replication Server 2530. The Data Connector 2520 is connected to a computer system 2535 via a third LAN connection 2550. The computer system 2535 hosts a program managing email, contacts, calendars etc., as e.g. provided by MS Outlook, a spread sheet program and/or a ODBC source. Examples of use may be the inclusion of personal address lists in a CRM (Customer Relationship Management) system, or the inclusion of experimental financial spreadsheet content during planning stages. For implementation the Data Connector connects to personal desktop data sources like Outlook contacts, Spreadsheets or Access databases. The advantages are the possibility and easy integration of personal data for ad-hoc reporting or management support.

FIG. 26 shows a system 2600 for integrating with a local email system to provide email content for the replication process. The system 2600 includes a data base 2610 connected via a first LAN connection 2615 to a Data Connector 2620, which is connected via a second LAN connection 2625 to a Replication Server 2630. The Data Connector 2620 is connected to a data source 2635 via a third LAN connection 2540. The data source 2635 host an exchange server, a POP-mail server and/or a SMTP-mail server. For implementation of such a system, the Data Connector connects to email systems like Exchange or via POP/SMTP services.

FIG. 27 shows a system 2700 for integrating with a remote email systems to provide email content for replication directly from a provider. The system 2700 includes a data base 2710 connected via a first LAN connection 2715 to a Data Connector 2720, which is connected via a second LAN connection 2725 to a Replication Server 2730. All of those components relate to one site, e.g., a company. The system 2700 further includes a data source 2735 which is located on a different site, e.g., an email service provider. The data source 2735 is connected to the Replication Server 2730 over the Internet, a DSL (Digital Subscriber Line), GPRS, UMTS, WLAN, WAN or VPN or any other IP-capable connection 2740, in order to connect both sites. The data source 2735 hosts a POP-mail server and/or a SMTP-mail server. For implementation, the Data Connector connects to a web based email systems via POP/SMTP services. This offers the advantage that businesses do not need a local email server for mail delivery with optional push features.

Figure 28:
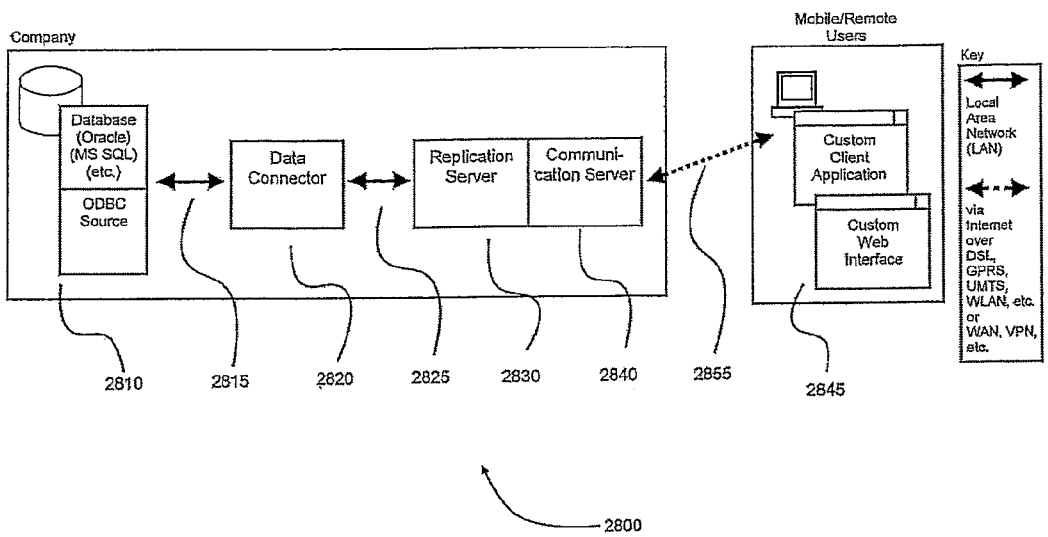
FIGS. 28, 29 and 30 illustrates the means in which remote/mobile devices may connect to the system according to the present invention; The system includes end-to-end push functionality on data, mail, contacts, calendar, etc.
Figure 29:
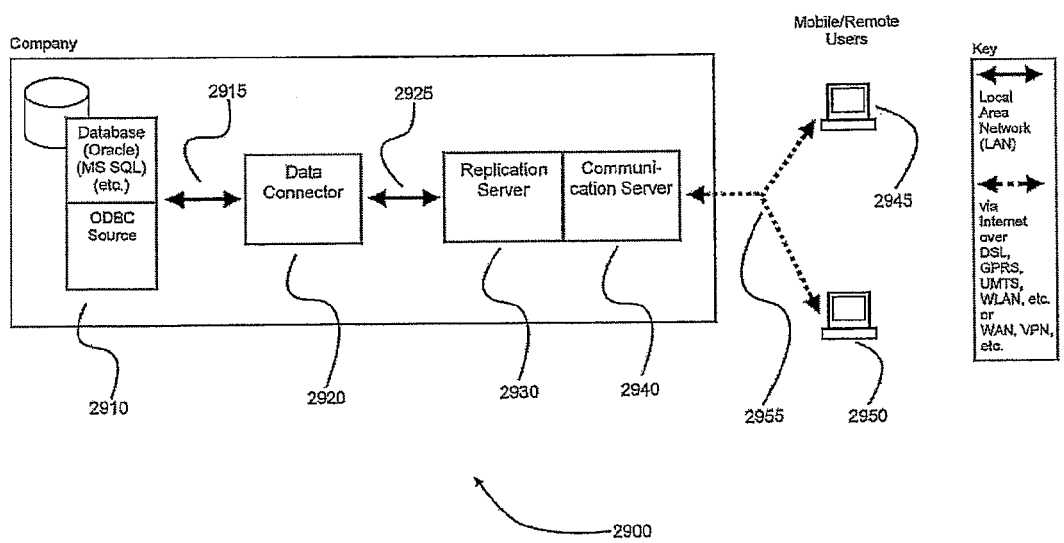
Figure 30:
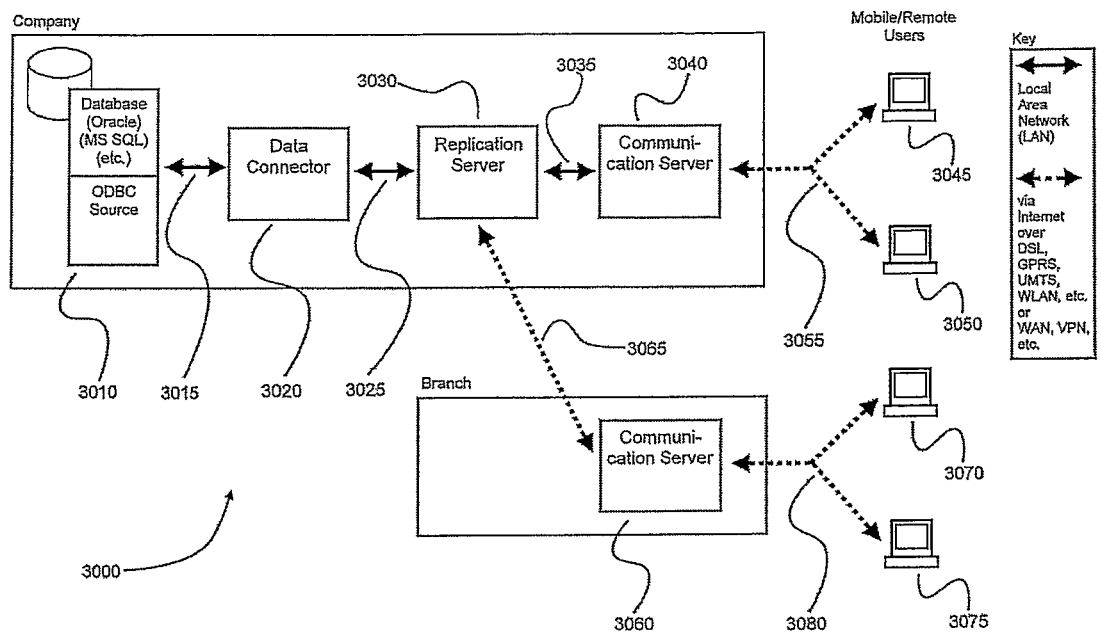

FIGS. 28, 29 and 30 illustrates the means in which remote/mobile devices may connect to the system according to the present invention. The system includes end-to-end push functionality on any type of data, mail, contacts, calendar etc., even if this is not explicitly shown in the drawings or the accompanying description.

FIG. 28 illustrates the implementation of how remote users may establish a connection between their desktop machine and the company. It shows a system 2800, which includes a data base 2810 connected via a first LAN connection 2815 to a Data Connector 2820, which is connected via a second LAN connection 2825 to a Replication Server 2830. The system 2800 further includes a Communication Server 2840, which is running on the same computer system (not shown) as the Replication Server 2830. Both are configured to communicate with each other. A first mobile/remote user 2845 is connected to the Communication Server 2840 over the Internet, a DSL (Digital Subscriber Line), GPRS, UMTS, WLAN, WAN or VPN or any other IP-capable connection 2855. The mobile/remote user is formed by a computer system hosting a custom client application and a custom web interface. Furthermore, a personal email system could be provided including contacts and calendar and many more.

FIG. 29 illustrates a Communication Server which offers a remote connection for many remote users. It shows a system 2900, which includes a data base 2910 connected via a first LAN connection 2915 to a Data Connector 2920, which is connected via a second LAN connection 2925 to a Replication Server 2930. The system 2900 further includes a Communication Server 2940, which is running on the same computer system (not shown) as the Replication Server 2930. Both are configured to communicate with each other. A first mobile/remote user 2945 and a second mobile/remote user 2950 are connected to the Communication Server 2940 over the Internet, a DSL (Digital Subscriber Line), GPRS, UMTS, WLAN, WAN or VPN or any other IP-capable connection 2955.

FIG. 30 indicates a variation on FIG. 29 implemented in a system 3000. The system 3000 includes a data base 3010 connected via a first LAN connection 3015 to a Data Connector 3020, which is connected via a second LAN connection 3025 to a Replication Server 3030, which is connected via a third LAN connection 3035 to a Communication Server 3040. All of those components relate to one site, e.g., a company. A first mobile/remote user 3045 and a second mobile/remote user 3050 are connected to the Communication Server 3040 over the Internet, a DSL (Digital Subscriber Line), GPRS, UMTS, WLAN, WAN or VPN or any other IP-capable connection 3055. The system 3000 further includes a second Communication Server 3060. This component relates to a different site, e.g., a branch or a B2B (business-to-business) partner and is connected to the Replication Server 3030 over another Internet, a DSL (Digital Subscriber Line), GPRS, UMTS, WLAN, WAN or VPN or any other IP-capable connection 3065. A third mobile/remote user 3070 and a fourth mobile/remote user 3075 are connected to the second Communication Server 3060 over another Internet, a DSL (Digital Subscriber Line), GPRS, UMTS, WLAN, WAN or VPN or any other IP-capable connection 3080. Here the Communication Servers are additionally implemented at branches to allow cheaper connections to local remote users. A benefit for companies that have branches in different countries.

Figure 31:
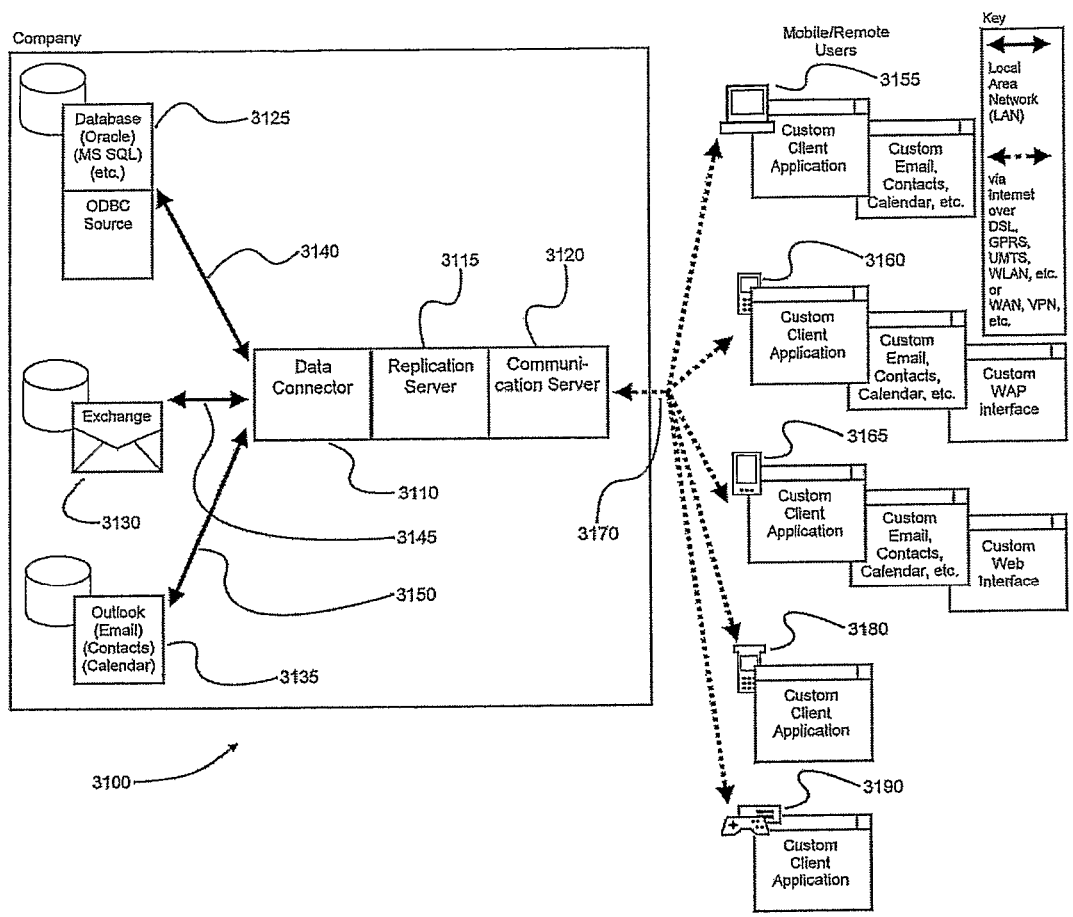
FIG. 31 illustrates a sample of the different remote/mobile client devices that may be used according to the present invention.

FIG. 31 illustrates a sample of the different remote/mobile client devices that may be used according to the present invention and illustrates the fact that different device types may be connected to the same Communication Server at a time. Shown is a system 3100 including end-to-end push functionality on any type of data, mail, contacts, calendar etc. The system 3100 includes a Data Connector 3110, a Replication Server 3115 and a Communication Server 3120, all of them running on the same computer system (not shown). A data base server 3125, an exchange server 3130 and an Communication Server 3135 (providing email, contacts, calendar etc.), such as MS Outlook, are connected to the Data Connector 3110 via a first LAN connection 3140, a second LAN connection 3145 and a third LAN connection 3150, respectively. A first remote user 3155 hosting a custom client application and a custom email, contacts, calendar program on a notebook/PC is connected to the Communication Server 3120 over an Internet, a DSL (Digital Subscriber Line), GPRS, UMTS, WLAN, WAN or VPN or any other IP-capable connection 3170. A second remote user 3160 hosting a custom client application and a custom email, contacts, calendar program and a custom WAP interface on a mobile (cellular) phone is connected to the Communication Server 3120 over the Internet, DSL (Digital Subscriber Line), GPRS, UMTS, WLAN, WAN or VPN or any other IP-capable connection 3170. A third remote user 3165 hosting a custom client application and a custom email, contacts, calendar program and a custom web interface on a PDA (Personal Digital Assistant) is connected to the Communication Server 3120 over the Internet, DSL (Digital Subscriber Line), GPRS, UMTS, WLAN, WAN or VPN or any other IP-capable connection 3170. A fourth remote user 3180 hosting a custom client application on a bar-code device, such as a bar-code reader, is connected to the Communication Server 3120 over the Internet, DSL (Digital Subscriber Line), GPRS, UMTS, WLAN, WAN or VPN or any other IP-capable connection 3170. A fifth remote user 3190 hosting a custom client, e.g., a multiplayer game on a desktop or game console is connected to the Communication Server 3120 over the Internet, DSL (Digital Subscriber Line), GPRS, UMTS, WLAN, WAN or VPN or any other IP-capable connection 3170. Other possible devices are listed above.

Client applications for Desktop PCs run under all Windows operating system versions from Windows98 upwards. For browser based access all common browser types are supported. For client applications on programmable Mobile phones, all platforms may be addressed, including PocketPC, WindowsMobile, Symbian and Java. For browser based access on Mobile phones, Web and WAP browsers are supported. Client applications for PDAs may be custom developed and delivered for mobile operating platforms, which include PocketPC, WindowsMobile, Symbial, PalmOS, Java-Enabled. For browser based access on PDAs, Web and WAP browsers are supported.

Figure 32:
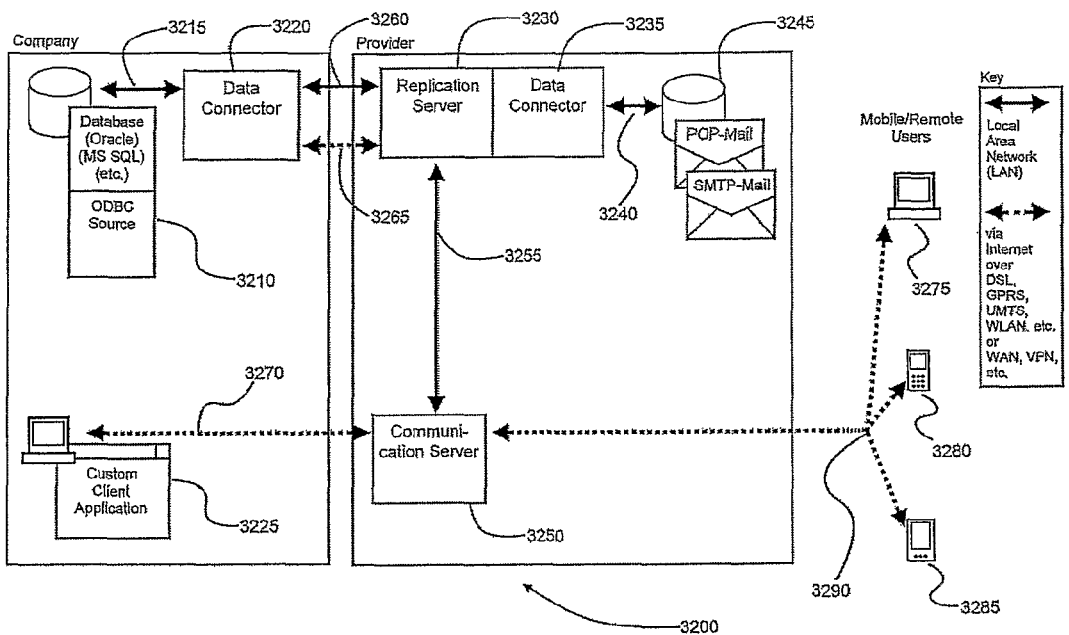
FIG. 32 illustrates special hosting possibilities via a Provider according to the present invention.

FIG. 32 illustrates special hosting possibilities via a Provider according to the present invention. A system 3200 is shown including a company site having a data base 3210 connected via a first LAN connection 3215 to a first Data Connector 3220, and a custom client application 3225 running on a computer system. The system 3200 further includes a provider site having a Replication Server 3230 and a second Data Connector 3235, both running on the same computer system (not shown) and being able to communicate with each other. The provider site further comprises a data source 3245 hosting POP mail and SMTP mail servers being connected to the second Data Connector 3235 via a second LAN connection 3240, and a Communication Server 3250 being connected to the Replication Server 3230 via a third LAN connection 3255. The provider site and the company site are connected to each other via a fourth LAN connection 3260 running from the first Data Connector 3220 to the Replication Server 3230, via an Internet, DSL (Digital Subscriber Line), GPRS, UMTS, WLAN, WAN or VPN or any other IP-capable connection 3265 running as well from the first Data Connector 3220 to the Replication Server 3230, and an Internet, DSL (Digital Subscriber Line), GPRS, UMTS, WLAN, WAN or VPN or any other IP-capable connection 3270 running from the custom client application 3225 to the Communication Server 3250. A first mobile user 3275, a second mobile user 3280 and a third mobile user 3285 are connected to the Communication Server 3250 over an Internet, DSL (Digital Subscriber Line), GPRS, UMTS, WLAN, WAN or VPN or any other IP-capable connection 3290.

The system includes end-to-end push functionality on any type of data, mail, contacts, calendar etc. Here a provider may offer the email and replication services on behalf of the company. The company may connect to the service from mobile devices or from desktops inside the company. Providers may use this implementation to round off their ASP-services for business. This offers them an easy way of integrating client backend data without costly and time-consuming integration development.

Figure 33:
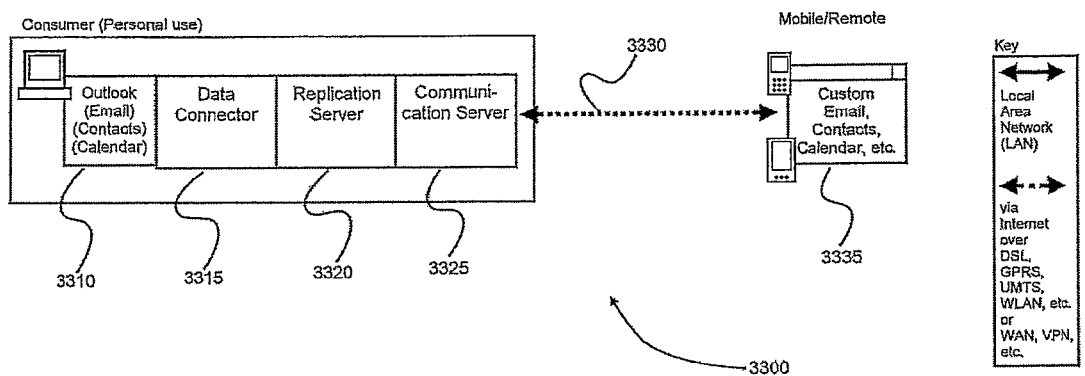
FIGS. 33, 34 and 35 illustrates special hosting possibilities for personal and business use according to the present invention.
Figure 34:
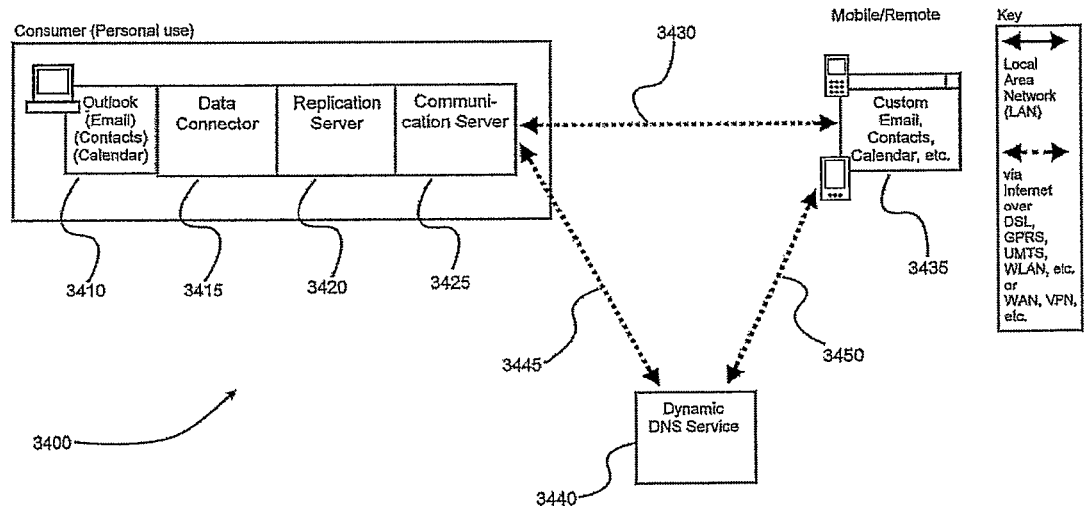
Figure 35:
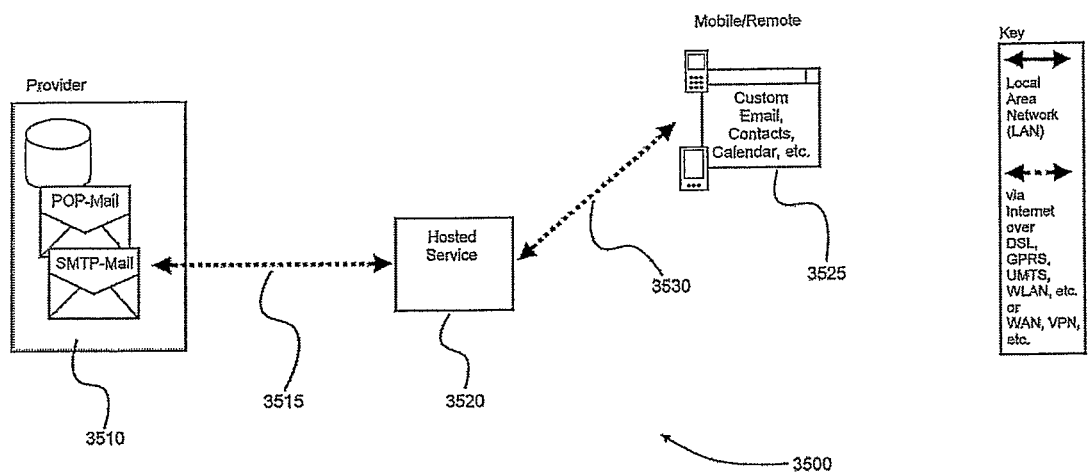

FIGS. 33, 34 and 35 illustrates special hosting possibilities for personal and business use according to the present invention.

FIG. 33 illustrates a system 3300 to be used on stand-alone computer systems, e.g., PC, as used by consumers, small offices/home offices (SoHo) with a dedicated internet connection and fixed IP-address or even a DNS-entry (Domain Name Server) may host the server technology on their home PCs. On a local computer system (not shown) a program 3310 for managing email, contacts and/or calendar data is provided, such as MS Outlook. On the same computer system there is a Data Connector 3315, a Replication Server 3320 and a Communication Server 3325 installed. The system 3300 is configured to allow communication between the Data Connector 3315 and Replication Server 3320 as well as between the Replication Server 3320 and the Communication Server 3325. Over an Internet, DSL (Digital Subscriber Line), GPRS, UMTS, WLAN, WAN or VPN or any other IP-capable connection 3330, the Communication Server 3325 is connected with a mobile/remote device 3335, such as a PDA (Personal Digital Assistant) or a mobile (cellular) phone. A Custom application managing email, contacts and/or calendar data is provided.

Via variations of this, e.g., a family or any defined group of users can implement, e.g., joint contact lists and calendars. Contact changes and calendar data may be delivered as an optional push service. This service may be implemented only using the Replication Server 3320, the Communication Server 3325 and a number of input/output devices (here 3335). In this arrangement a replication between two different input/output devices is realized without a connection to a backend data source.

FIG. 34 illustrates a system 3400 providing a solution in cases, in which a stand-alone computer system, e.g., PC, as used by consumers, small offices/home offices (SoHo) lacks a fixed IP-address. On a local computer system, a program 3410 for managing email, contacts and/or calendar is provided, such as MS Outlook. On the same computer system there is a Data Connector 3415, a Replication Server 3420 and a Communication Server 3425 installed. The system 3400 is configured to allow communication between the Data Connector 3415 and Replication Server 3420 as well as between the Replication Server 3420 and the Communication Server 3425. Over a first Internet, DSL (Digital Subscriber Line), GPRS, UMTS, WLAN, WAN or VPN or any other IP-capable connection 3430, the Communication Server 3425 is connected with a mobile/remote device 3435, such as a PDA (Personal Digital Assistant) or a mobile (cellular) phone. A Custom application managing email, contacts and/or calendar data is provided. In order to dynamically determine the dynamic IP address a Dynamic DNS (Domain Name Server) Service 3440 is provided. The Dynamic DNS Service 3440 is on one hand connected to the Communication Server via a second Internet, DSL (Digital Subscriber Line), GPRS, UMTS, WLAN, WAN or VPN or any other IP-capable connection 3445 and, on the other hand, connected to the mobile/remote device 3435 via a third Internet, DSL (Digital Subscriber Line), GPRS, UMTS, WLAN, WAN or VPN or any other IP-capable connection 3450.

The Dynamic DNS Service 3440 may now be used to establish a connection to the privately hosted Communication Server 3425 for determining the IP address. No personal data passes through $3^{rd}$ party hands. Mail, contact changes and calendar data may be delivered as an optional push service directly from the Communication Server 3425 to the mobile/remote device 3435.

FIG. 35 illustrates a system 3500 using a hosted service. The system 3500 includes a provider 3510 hosting a POP-mail server and/or a SMTP-mail server. Those servers are reachable via a first Internet, DSL (Digital Subscriber Line), GPRS, UMTS, WLAN, WAN or VPN or any other IP-capable connection 3515 by a hosted service 3520. The hosted service is connected to a mobile/remote device 3525 via a second Internet, DSL (Digital Subscriber Line), GPRS, UMTS, WLAN, WAN or VPN or any other IP-capable connection 3530. A Custom application managing email, contacts and/or calendar data is provided on the mobile/remote device 3525. The hosted service 3520 retrieves emails from a provider on behalf of a client. Mail, contact changes and calendar data may be delivered as an optional push service to the mobile/remote device 3525.

Figure 36:
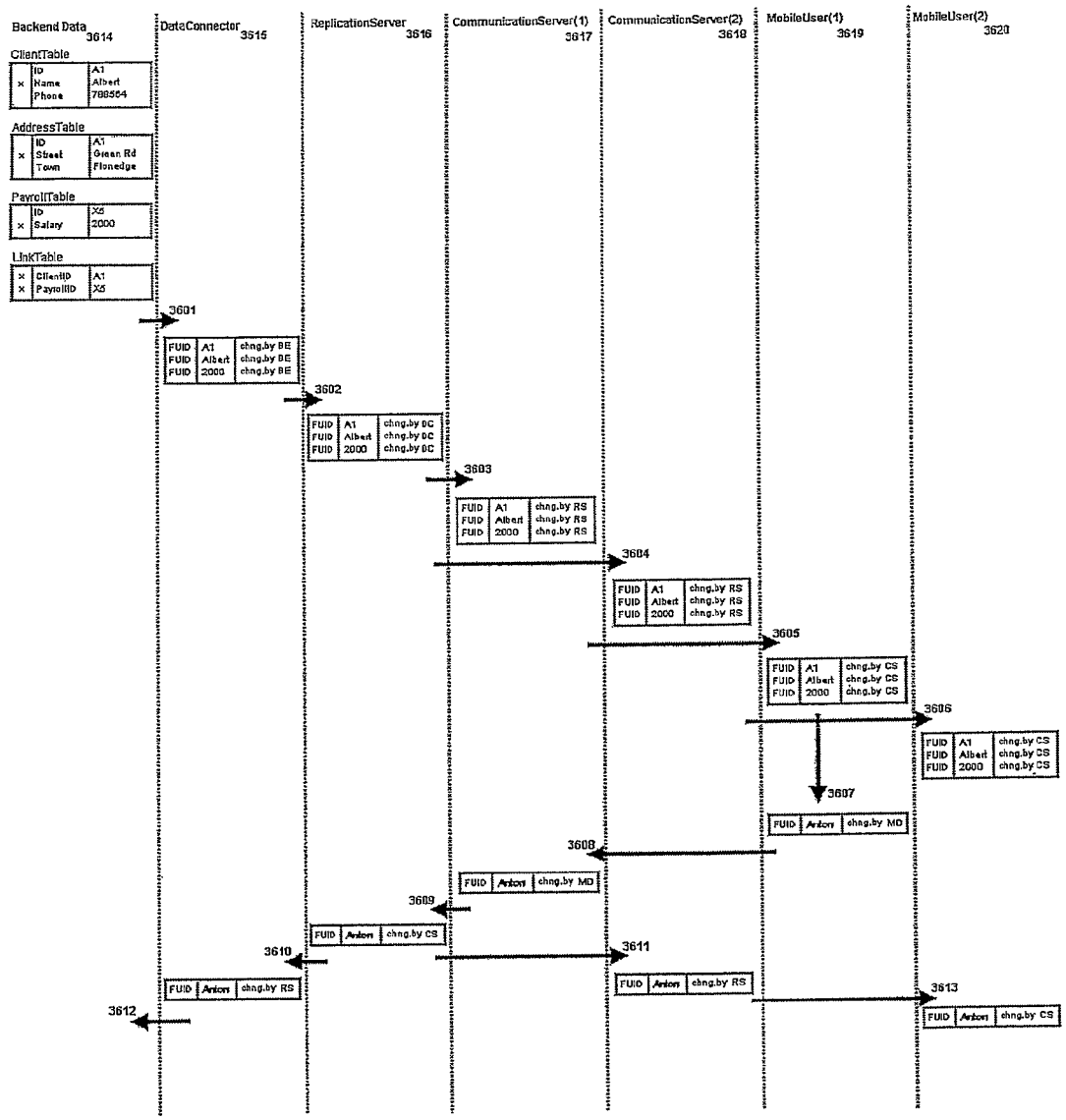
FIG. 36 illustrates a typical integration and replication process according to the present invention.

FIG. 36 illustrates a typical integration and replication process according to the present invention. The following components are involved, a backend data 3614, a Data Connector 3615, a Replication Server 3616, a first Communication Server 3617, a second Communication Server 3618, a first Mobile User 3619 and a second Mobile User 3620. Each of the depicted columns represents a server component or mobile device as listed above.

The first and the second Communication Server 3617 and 3618 are two separate Communication Servers. The first and the second Mobile User 3619 and 3620 are two separate mobile devices connected to the first and second Communication Servers 3617 and 3618, respectively.

The timeline is represented vertically with the representation of the data flow.

The four columns under the Backend Data 3614 represent sample data from the backend source database. These are a Client table, an Address table with addresses for each Client, linked by the ID key. A Payroll table from an accounting system where the Client key is different from that in the client table. Also a Link table, which links the Key fields in the Client table and the Payroll table. The x in the table columns represent the fields chosen for replication to the mobile devices. The fields in the Link table have been defined in the Data Connector as reference fields for the integration process, and not to be included in the replication process.

It is assumed that a new set of data has become available in the backend data 3614. The appropriate data will now be replicated by the Data Connector 3615 to itself using the integration rules given by the administrator (arrow 3601). The Data Connector will maintain integrity to the backend data by internally linking each field to its originating database, table, row and field. Additionally to the field level timestamp, this data is now flagged as "changed by the back end" and will replicate to the Replication Server 3616.

A copy of the data stays in the Data Connector 3615. This is an intended feature of the system to facilitate data availability in a distributed environment. The data is transmitted to the Replication Server 3616 (arrow 3602). In the Replication Server 3616 the data is now flagged as "changed by the Data Connector". Triggered by this flag, the Replication Server 3616 distributes the data according to the predefined replication rules to the two respective Communication Servers 3617, 3618 (arrows 3603 and 3604).

In the Communication Servers 3617 and 3618 the data is flagged as "changed by the Replication Server". The data will now replicate to any connected and entitled devices on demand or by the optional push functionality (arrows 3605 and 3606).

Assuming the user of the first mobile device 3619 changes the name of the client (arrow 3607) and is entitled by the administration to do so. This will initiate a replication back to the applicable Communication Server 3617 (arrow 3608) on demand or optionally via a reverse push. Here the data is now flagged as "changed by the mobile device" and will replicate back to the Replication Server 3616 (arrow 3609). The flag "changed by the first Communication Server" will cause a replication to the second Communication Server 3618 (arrow 3611) and back to the Data Connector 3615 (arrow 3610). The Data Connector will perform its predefined integration rules, match the changed field up to its original table, row and field; do integrity checking and commit the changes to the backend data 3614 (arrow 3612). The second Communication Server 3618 will replicate with a second mobile device 3620 on demand or by the optional push functionality (arrow 3613).

This description is only an indication of the processes involved in the replication and integration process.

Transaction and integrity resolution can be managed by making update priorities time based, e.g., who changed what first, directional e.g. backend changes take precedence over mobile changes, user and device based e.g. mobile sales has precedence over telesales. Cascaded combinations of these are also possible.

Channelling of the replication process can also be implemented, for example, forcing mobile changes which pass through the Communication Server to first go through the Replication Server for integrity check before it can get replicated to other mobile devices connected to the Communication Server.

The preceding drawings illustrate the framework for a flexible replication system with the main aim to simplify data integration, produce an integration structure that can accommodate backend structural changes and can cope with highly distributed data sources. Also, it creates a framework for delivering highly accessible, secure data to a mobile environment with minimal transfer loads during sending and receiving, and secure data on the mobile client devices. Added to this, making use of modem mobile connection types for delivering push content from and/or to a wide spectrum of devices. Specific methods that empower this invention will be described in the following.

The replication mechanism utilizes time based arbitration rules for conflict resolution. The invention specifies this time stamp on field level. For this mechanism a time synchronization between server and client device is initiated before transaction handling. The time stamp on changes from any source are thus the actual time the change was recorded, not the replication time. This increases the accuracy and minimizes conflicts during replication. A further specification for conflict resolution may be defined by giving precedence to specific users and/or devices and/or connection types. E.g. this allows a conflict situation to be resolved by giving users over a LAN connection to have precedence over mobile users, or vice-versa.

For replication purposes, a further enhancement, is the field level addition of logging of which source effected the change. This inclusion optimizes the internal replication processes in the system and offers complete transaction transparency, in case a manual conflict resolution is required.

For secure transaction handling during data transmission, nested transaction rules may be defined for data integrity and definition of business rules. In its simplest form it may mean that data from separate tables which form a whole, must be complete before replication or integration processes start. For example, during the replication of contact persons, the replication process waits until corresponding company information is found before the data is replicated. A more complex example of this may be as follows: An order application is sent from a mobile device. The Replication Server then needs to check the client credit limit and stock availability before the order is sent to dispatch and confirmed to sending device.

The installation process is all inclusive. No additional $3^{rd}$ party software like web- or email-servers are required for the operation of the system, unlike other products which may offer parts of the server solution, yet rely heavily on the functionality of preinstalled software. This offers a great reduction in cost and complexity.

The server components of the software may be delivered on CD Compact Disk, offered as a download, or any other common means of data storage. Server updates may be acquired by the same means or as an automated online update service hosted by the supplier if preferred.

The server components e.g. Replication Server, Communication Server and Data Connector may be installed as a whole on one machine. Alternatively, one or more components may be installed separately on individual machines depending on the implementation plan.

The client components for desktop computers may be delivered for installation via CD, offered as a download or any other means of data storage. Client updates may be acquired by the same means or as an automated online update service, included in the server software, if preferred. Version control of the client software is monitored by the server and updates may be automatic or on demand after notification from the server.

The client components for mobile devices such as PDAs, mobile phones, etc. may also be delivered via CD, download, or any other common means of data transfer medium. The installation may then be initiated from a PC to the mobile device connected to the PC via, for example, a serial connection (e.g., USB) to a cradle, wireless Bluetooth connection, or any other. The web services integrated into the server may also be used to offer online installation and update procedures over the internet.

During the setup procedure, each component must be registered with a unique CUID (Component Unique Identification). This CUID is allocated by the supplier and must be a unique ID worldwide. This ID is used for control during replication and integration and allows interoperability between servers from different companies at a later stage.

Each user and device is also allocated a unique ID. These IDs are managed by the server and are drawn from a pool of IDs, specific to one Communication Server. This facilitates mobile replication and offers a high degree of control and security during transaction logging.

Administration of the entire system may be done from the one or many Administration Consoles independent of the number of the components connected to the system. The Administration Console may be accessed from any of the server components, irrespective of their location. E.g. this means that the Administration Console may be started on the computer where the Data Connector is installed, to manage user access to a Communication Server that may be installed on a different machine in a different location connected to the system. Additionally, the Administration Console may be accessed via a Web- or WAP-interface such as is included in the Communication Server. This allows greater access and flexibility for administrators for administration functions in a distributed environment. Access to the Administration Console is granted via a valid username and password.

For additional security for Web- and WAP-based administration, the administrator may set a third, time-limited identifier.

The Administration Console may also be run as a client component on a mobile device which in turn then communicates with the server via a Communication Server. This allows full use of compression and public-private-key encryption features during the administration session.

In cases where multiple components are implemented, e.g., two Replication Servers or multiple Communication Servers, the administration may be divided into areas of responsibility. A possible implementation of this is delegated user administration. Department heads may have the right to administrate mobile users under their responsibility. Another implementation of this is where two Replication Servers from different companies are connected for replication and integration purposes. Here each company would have access to only the administration areas belonging to them. This is another aspect where the CUIDs (Component Unique IDs) play a role.

The invention claimed is:

1. A system for at least one of replication, integration, consolidation and mobilization of data to integrate diverse data sources, whereby the system includes:
   a Replication Server for managing the replication of data
   (i) between at least two heterogeneous backend data sources, and/or
   (ii) between at least one backend data source and a client application and/or a mobile client application in at least one input/output device and/or
   (iii) between client applications and/or mobile client applications in at least two input/output devices,
   a Data Connector for connecting to any type of structured data sources,
   a Communications Server for access to and from said input/output devices over a communication link, and
   a common administration being formed by one single administration unit,
   wherein said system is configured to utilize a field-driven data structure designed to address both replication and integration needs,
   wherein more than one instance is provided of one of said Replication Server, said Data connector and said Communication Server and each instance features its own data storage for facilitating independent operation,
   wherein said Data Connector is adapted to communicate with at least one backend data source and at least one Replication Server, whereby said Data Connector is independently implemented from said Replication Server, so that flexibility and scalability is achieved for data traffic optimization, wherein replication frequency, read/write access on tables and fields, and integrity rules are definable in each of the Data Connectors and the Data Connectors are configurable to automatically detect the data structures or available data fields from connected backend data sources;
   wherein said Communications Server is adapted to communicate with at least one input/output device and at least one Replication Server, whereby said Communications Server is independently implemented from said Replication Server, so that flexibility and scalability is achieved for data traffic optimization,
   wherein the Replication Server is responsible for maintaining data access rights for users and groups, the rights being configurable down to a field level and indicate which access rights a user has per field, and
   wherein the replication mechanism uses time-based arbitration rules for conflict resolution by initiating synchronization between a server and a client device before transaction handling and giving precedence to at least one of specific users, specific devices, or specific connection types, wherein at least one of said input/output devices is equipped with a mobile client application, wherein said client applications are formed by at least two different client applications and the at least one instance of said Replication Server, said Data Connector and said Communication Server, may be configured to initiate a push transaction to communicate data to a target module or stationary wire-based device or mobile wireless device.

2. The system according to claim 1, wherein one or more of the following modules: Replication Server, Data Connector and Communications Server, may be implemented to function autonomously from the other modules.

3. The system according to claim 1, wherein said system includes a plurality of Replication Servers and wherein said Replication Server is connected to at least one Data Connector.

4. The system according to claim 1, wherein said system includes a plurality of Replication Servers and wherein said Replication Server is connected to at least one Communication Server.

5. The system according to claim 1, wherein said Replication Server is adapted to communicate with at least one Data Connector and at least one Communications Server, whereby said Replication Server is independently implemented from said Data Connector and said Communications Server, so that flexibility and scalability is achieved for data traffic optimization.

6. The system according to claim 1, wherein said system includes a plurality of Communications Servers and wherein said Replication Server is set up to communicate with at least two of said plurality of Communications Server.

7. The system according to claim 1, wherein said system includes a plurality of input/output devices and wherein said Communications Server is set up to communicate with at least two of said plurality of input/output devices.

8. The system according to claim 1, wherein at least a subset of said at least two input/output devices is equipped with a client application or a mobile client application.

9. The system according to claim 1, wherein said communication link is formed by one of a group of connections, said group comprising: a wireless connection and a wire-based connection.

10. The system according to claim 1, wherein said common administration is divided into separate administration units with respect to predetermined field of responsibility by means of access rights.

11. The system according to claim 1, wherein a common data structure is provided from said Data Connector, through said Replication Server, to said Communication Server, providing flexibility during integrations.

12. The system according to claim 11, wherein said common data structure is configured to offer user level access rights control down to field level.

13. The system according to claim 11, wherein said common data structure is configured to offer device level access rights control down to field level.

14. The system according to claim 11, wherein said common data structure is configured to offer connection type level access rights control down to field level.

15. The system according to claim 1, wherein anyone of the modules, namely, said Data Connector and said Communication Server, may be implemented in any number of instances and be combined around one or more Replication Servers, to offer maximum cooperative distribution.

16. The system according to claim 1, wherein the configuration for push transactions may be set to event-driven or time-based rules.

17. The system according to claim 1, wherein said system is configured to manage version control over client applications.

18. The system according to claim 1, wherein said system is configured to automatically distribute version updates.

19. The system according to claim 1, wherein said system is configured to manage version control over its own modules, namely, Replication Server, Data Connector and Communication Server, in order to facilitate automated version updates in a distributed environment.

20. The system according to claim 1, wherein said system is configured to manage dynamic template adjustments on the client application according to changes in data structures and/or access rights.

* * * * *